United States Patent
Nock et al.

(10) Patent No.: US 11,521,106 B2
(45) Date of Patent: Dec. 6, 2022

(54) LEARNING WITH TRANSFORMED DATA

(71) Applicant: National ICT Australia Limited, Eveleigh (AU)

(72) Inventors: Richard Nock, Eveleigh (AU); Giorgio Patrini, Eveleigh (AU); Tiberio Caetano, Eveleigh (AU)

(73) Assignee: National ICT Australia Limited, Eveleigh (AU)

( * ) Notice: Subject to any disclaimer, the term of this patent is extended or adjusted under 35 U.S.C. 154(b) by 648 days.

(21) Appl. No.: 15/521,441

(22) PCT Filed: Oct. 23, 2015

(86) PCT No.: PCT/AU2015/050653
§ 371 (c)(1),
(2) Date: Apr. 24, 2017

(87) PCT Pub. No.: WO2016/061628
PCT Pub. Date: Apr. 28, 2016

(65) Prior Publication Data
US 2017/0337487 A1 Nov. 23, 2017

(30) Foreign Application Priority Data
Oct. 24, 2014 (AU) .................................. 2014904261
Feb. 2, 2015 (AU) .................................. 2015900308

(51) Int. Cl.
*G06N 20/00* (2019.01)
*G06F 16/28* (2019.01)
*G06N 3/08* (2006.01)

(52) U.S. Cl.
CPC .......... *G06N 20/00* (2019.01); *G06F 16/285* (2019.01); *G06N 3/08* (2013.01)

(58) Field of Classification Search
CPC ......... G06N 20/00; G06N 3/08; G06F 16/285
See application file for complete search history.

(56) References Cited

U.S. PATENT DOCUMENTS 6,789,069 B1 * 9/2004 Barnhill ................ G16B 40/20
706/12
7,827,123 B1 11/2010 Yagnik
(Continued)

FOREIGN PATENT DOCUMENTS

| CN | 1029687696 A | 3/2013 | |
|---|---|---|---|
| WO | 2014118978 A1 | 8/2014 | |
| WO | WO-2014118978 A1 * | 8/2014 | ............. G06F 17/16 |

OTHER PUBLICATIONS

Jabo, "Machine Vision for Wood Defect Detection and Classification", 2011, Chalmers University of Technology, pp. 1-106 (Year: 2011).*

(Continued)

*Primary Examiner* — Li B. Zhen
*Assistant Examiner* — Henry Nguyen
(74) *Attorney, Agent, or Firm* — Kilpatrick Townsend & Stockton LLP

(57) ABSTRACT

This disclosure relates to learning with transformed data such as determining multiple training samples from multiple data samples. Each of the multiple data samples comprises one or more feature values and a label that classifies that data sample. A processor determines each of the multiple training samples by randomly selecting a subset of the multiple data samples, and combining the feature values of the data samples of the subset based on the label of each of the data samples of the subset. Since the training samples are combinations of randomly chosen data samples, the training samples can be provided to third parties without disclosing the actual training data. This is an advantage over existing methods in cases where the data is confidential and should therefore not be shared with a learner of a classifier, for example.

25 Claims, 12 Drawing Sheets

(56) References Cited

U.S. PATENT DOCUMENTS

| | | | | |
|---|---|---|---|---|
| 8,972,307 | B1* | 3/2015 | Servedio | H04L 51/12 |
| | | | | 706/12 |
| 9,501,749 | B1* | 11/2016 | Narsky | G06N 7/023 |
| 2005/0021221 | A1 | 1/2005 | Cole et al. | |
| 2005/0143971 | A1* | 6/2005 | Burstein | G06F 40/253 |
| | | | | 704/4 |
| 2007/0143289 | A1 | 6/2007 | Dwork et al. | |
| 2007/0147606 | A1 | 6/2007 | Dwork et al. | |
| 2007/0239444 | A1* | 10/2007 | Ma | G10L 15/20 |
| | | | | 704/233 |
| 2008/0027887 | A1* | 1/2008 | Barbu | G06N 20/00 |
| | | | | 706/25 |
| 2008/0288292 | A1 | 11/2008 | Bi et al. | |
| 2009/0327296 | A1 | 12/2009 | Francis et al. | |
| 2013/0124561 | A1 | 5/2013 | Pradhan et al. | |
| 2013/0315477 | A1* | 11/2013 | Murray | G06F 16/58 |
| | | | | 382/159 |
| 2014/0129226 | A1* | 5/2014 | Lee | G10L 15/04 |
| | | | | 704/254 |
| 2015/0063688 | A1* | 3/2015 | Bhardwaj | G06K 9/18 |
| | | | | 382/159 |
| 2015/0278707 | A1* | 10/2015 | Beymer | G06N 20/00 |
| | | | | 706/12 |
| 2015/0356458 | A1* | 12/2015 | Berengueres | G06N 7/005 |
| | | | | 706/12 |

OTHER PUBLICATIONS

Lin, Keng-Pei, and Ming-Syan Chen. "Privacy-preserving outsourcing support vector machines with random transformation." Proceedings of the 16th ACM SIGKDD international conference on Knowledge discovery and data mining. 2010. (Year: 2010).*

Chen, Shang-Liang, and Y. W. Jen. "Data fusion neural network for tool condition monitoring in CNC milling machining." International journal of machine tools and manufacture 40.3 (2000): 381-400. (Year: 2000).*

Denning, Dorothy E., "Secure statistical databases with random sample queries", ACM Transactions on Database Systems, ACM, Newyork, NY, US, vol. 5, No. 3, Sep. 1, 1980, pp. 291-315, XP058320024, ISSN: 0362-5915, DOI: 10.1145/320613.320616, 25 pages.

Hernandez et al., "Learning Naive Bayes Models for Multiple-Instance Learning with Label Proportions", Nov. 7, 2011, ECCV 2016 Conference: [Lecture Notes in Computer Science; Lect. Notes Computer], Springer International Publishing, Cham, pp. 134-144, XP047373004, ISSN: 0302-9743, ISBN: 978-3-319-69952-3, 11 pages.

Le-Rademacher et al., "Symbolic Covariance Principal Component Analysis and Visualization for Interval—Valued Data", Journal of Computational and Graphical Statistics, vol. 21, No. 2, Apr. 1, 2012, pp. 413-432, XP055472354, US, ISSN: 1061-8600, DOI: 10.1080/10618600.2012.679895, 21 pages.

Patrini et al., "(Almost) No Label No Cry", Dec. 8, 2014, XP055471444, Retrieved from the Internet: URL http://www.tiberiocaetano.com/papers/2014/PatNocRivCae14.pdf [retrieved on Apr. 30, 2018], pp. 2-6.

Quadrianto et al., "Estimating Labels from Label Proportions", Journal of Machine Learning Research, vol. 10, Oct. 1, 2009, pp. 2349-2374, XP055471469, 26 pages.

Yu et al., "On Learning With Label Proportions", Feb. 24, 2014, XP055471461, Retrieved from the Internet: URL: https://arxiv.org/pdf/1402.5902v1.pdf [retrieved on Apr. 30 2018], pp. 3-9, pp. 11-13, figures 1-2: table 1.

Extended European Search Report for EP 15853557 dated Jul. 2, 2018, 12 pages.

Aggarwal, C, et al., A Condensation Approach to Privacy Preserving Data Mining, Advances in Data Technology—EDBT 2004: $9^{th}$ International Conference on Extending Database Technology, Heraklion, Crete, Greece, Mar. 14-18, 2004, Lecture Notes In Computer Science, Springer Berlin Heidelberg, vol. 2992, 2004, ISBN 978-3-540-21200-3, pp. 183-199.

Domingo-Ferrer, J., A Survey of Inference Control Methods for Privacy-Preserving Data Mining, Privacy-Preserving Data Mining—Models and Algorithms, Springer US, 2008, ISBN 978-0-387-70992-5, pp. 53-80.

Sakuma, Jun, Privacy-Preserving Evaluation of Generalization Error and Its Application to Model and Attribute Selection, Appears In *Proceedings of the $1^{st}$ Asian Conference on Machine Learning*, Nanjing, China, Nov. 2-4, 2009, 16 pages.

Mohrl, Mehryar, Deep Boosting, Courant Institute & Google Research, 40 pages.

International Search Report and Written Opinion corresponding to PCT/AU2015/060653 dated Dec. 8, 2015.

* cited by examiner

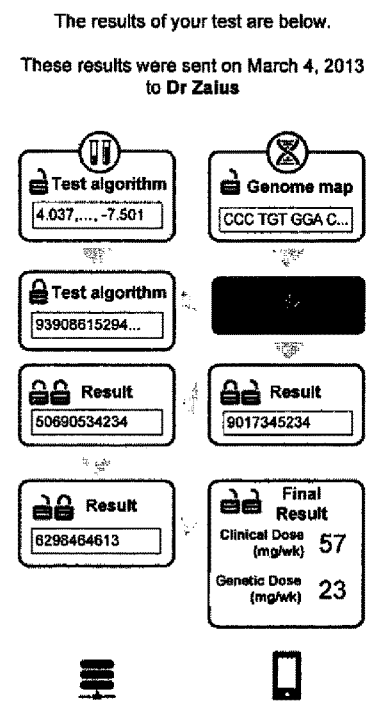

You have a Warfarin Dose request

Please select genome map and check if your settings are still valid

Age 23
Height (cm) 157
Weight (kg) 70

European

Are you taking enzyme inducers? No
Are you taking amiodarone? No

Fig. 3(A)

The results of your test are below.

These results were sent on March 4, 2013 to Dr Zaius

Test algorithm
4.037,..., -7.501

Genome map
CCC TGT GGA C...

Test algorithm
93908615294...

Result
50690534234

Result
9017345234

Result
6298464613

Final Result
Clinical Dose (mg/wk) 57
Genetic Dose (mg/wk) 23

Fig. 3(B)

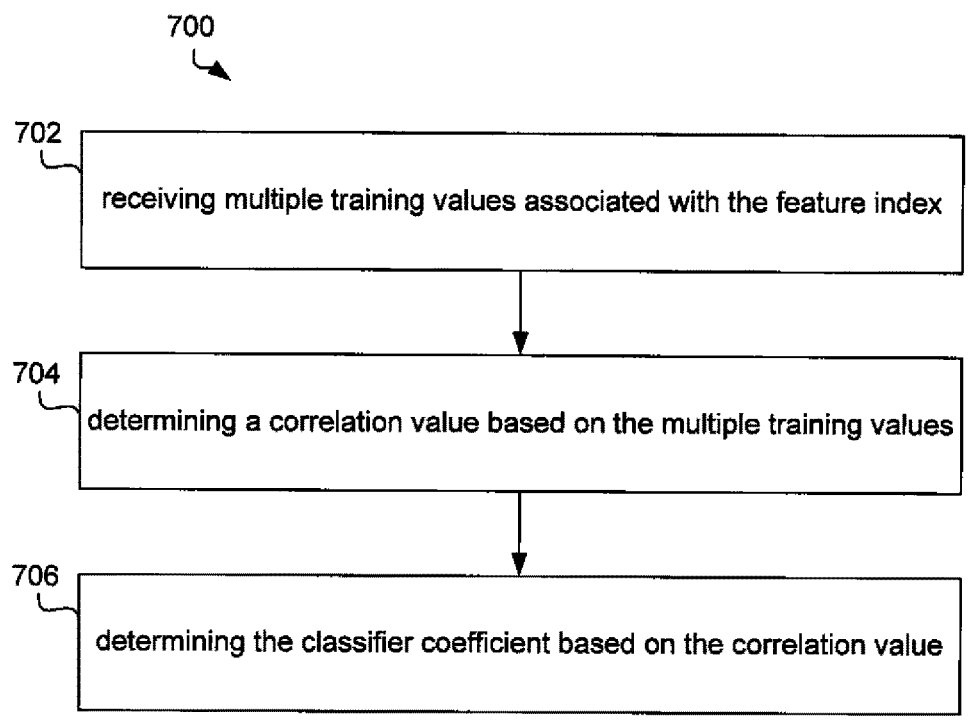
Fig. 7
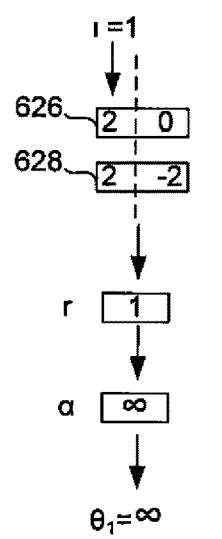 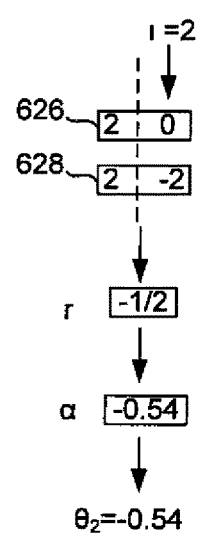
Fig. 8(A)  Fig. 8(B)

900

Algorithm 1 Rademacher operator boosting (RadoBoost)

Input set of centered rados $S_*$ with card$(S_*) = n$, number of iterations $T \in \mathbb{N}_*$; ⟵ 702
Step 1: let $\theta_0 \leftarrow 0$, $w_0 \leftarrow (1/n)\mathbf{1}$ ; // initial classifier and weights
Step 2: for $t = 1, 2, ..., T$
    Step 2.1: $[d] \ni \iota(t) \leftarrow \text{WFI}(S_*, w_t)$; // get weak feature predictor index $\iota(t)$
    Step 2.2: let $$704 \quad r_t \leftarrow \frac{1}{\pi_{*\iota(t)}} \sum_{j=1}^{n} w_{tj} \pi_{j\iota(t)} \; ; \tag{19}$$

$$\alpha_t \leftarrow \frac{1}{\pi_{*\iota(t)}} \log \frac{1 + r_t}{1 - r_t} \; ; \tag{20}$$

Step 2.3: for $j = 1, 2, ..., n$ $$902 \quad w_{(t+1)j} \leftarrow w_{tj} \cdot \left( \frac{1 - \frac{r_t \pi_{j\iota(t)}}{\pi_{*\iota(t)}}}{1 - r_t^2} \right) \; ; \tag{21}$$

Return $\theta_T$ defined by:

$$706 \quad \theta_{Tk} \doteq \sum_{t:\iota(t)=k} \alpha_t \; , \forall k \in [d] \; ; \tag{22}$$

| Algorithm 2 Feature-wise differential privacy compliant releasing of rados (DP-FEAT) |
|---|
| Input set of examples $S$, target feature $k$, number of rados $n$, differential privacy parameter $\epsilon > 0$; |
| Step 1 : let $\beta \leftarrow 1/(1 + \exp(\epsilon/2)) \in [0, 1/2)$; |
| Step 2 : If $m < (1 + 2\beta)/(1 - 2\beta)$ then<br>    multiply each example $m_\beta \doteq \lceil (1 + 2\beta)/((1 - 2\beta)m) \rceil$ times in $S$; |
| Step 3 : let |
| $$\Sigma_{m,\beta} \doteq \left\{ \sigma \in \Sigma_m : -(m - m_k(+)) + \beta(m+1) \leq \frac{1}{2} \cdot (\pi_\sigma^y)_k \leq m_k(+) - \beta(m+1) \right\} . \quad (30)$$ |
| Step 4 : sample $\sigma_1, \sigma_2, ..., \sigma_n$ i.i.d. (uniform) in $\Sigma_{m,\beta}$;<br>Return set of rados $\{\pi_\sigma^y : \sigma$ sampled in Step 4$\}$; |

Fig. 13

| # | $\ell_e(z, \mu_e)$ | $\ell_r(z, \mu_r)$ | $\varphi_r(z)$ | $\mu_e$ and $\mu_r$ | $a_e$ | Ref |
|---|---|---|---|---|---|---|
| I | $\sum_{i \in [m]} \log(1 + \exp(z_i^e))$ | $\sum_{\mathcal{J} \subseteq [m]} \exp(z_{\mathcal{J}}^r)$ | $z \log z - z$ | $\forall \mu_e = \mu_r$ | $\mu_e$ | Cor. 7 |
| II | $\sum_{i \in [m]} (1 + z_i^e)^2$ | $-(\mathbb{E}_{\mathcal{J}}[-z_{\mathcal{J}}^r] - \mu_r \cdot \mathbb{V}_{\mathcal{J}}[-z_{\mathcal{J}}^r])$ | $(1/2) \cdot z^2$ | $\forall \mu_e = \mu_r$ | $\mu_e/4$ | Cor. 9 |
| III | $\sum_{i \in [m]} \max\{0, z_i^e\}$ | $\max\{0, \max_{\mathcal{J} \subseteq [m]}\{z_{\mathcal{J}}^r\}\}$ | $\chi_{[0,1]}(z)$ | $\forall \mu_e, \mu_r$ | $\mu_e$ | Cor. 11 |
| IV | $\sum_i z_i^e$ | $\mathbb{E}_{\mathcal{J}}[z_{\mathcal{J}}^r]$ | $\chi_{[\frac{1}{2^m}, \frac{1}{2}]}(z)$ | $\forall \mu_e, \mu_r$ | $\mu_e$ | Cor. 13 |

Algorithm 1 $\Omega$-R.ADABOOST

Input set of rados $S_r \doteq \{\pi_1, \pi_2, ..., \pi_n\}$; $T \in \mathbb{N}_*$; $\omega \in \mathbb{R}_+$; $\gamma \in \mathbb{R}^p$;
Step 1: let $\theta_0 \leftarrow 0$, $w_0 \leftarrow (1/n)\mathbf{1}$;
Step 2: for $t = 1, 2, ..., T$
    Step 2.1: call the weak learner $$(\iota(t), r_t) \leftarrow \Omega\text{-WL}(S_r, w_t, \gamma, \omega, \theta_{t-1}) \quad (27)$$

Step 2.2: let $$\alpha_{\iota(t)} \leftarrow \frac{1}{2\pi_{*\iota(t)}} \log \frac{1+r_t}{1-r_t} ; \quad (28)$$

$$\delta_t \leftarrow \omega \cdot (\Omega(\theta_t) - \Omega(\theta_{t-1})) ; \quad (29)$$

Step 2.3: for $j = 1, 2, ..., n$ $$w_{tj} \leftarrow \frac{w_{(t-1)j}}{Z_t} \cdot \exp\left(-\alpha_t \pi_{j\iota(t)} + \delta_t\right) \quad (30)$$

Return $\theta_T$;

Algorithm 2 $\Omega$-WL, for $\Omega \in \{\|\cdot\|_1, \|\cdot\|_\Gamma^2, \|\cdot\|_\infty\}$

Input set of rados $S_r \doteq \{\pi_1, \pi_2, ..., \pi_n\}$; weights $w \in \Delta_n$; parameters $\gamma \in (0, 1)$, $\omega \in \mathbb{R}_+$; classifier $\theta \in \mathbb{R}^d$;
Step 1: pick weak feature $\iota_* \in [d]$;

Optional — use preference order:

$$\iota \succeq \iota' \Leftrightarrow |r_\iota| - \delta_\iota \geq |r_{\iota'}| - \delta_{\iota'} ; \quad (31)$$
$$(\delta_\iota \doteq \omega \cdot (\Omega(\theta + \alpha_\iota \cdot \mathbf{1}_\iota) - \Omega(\theta)))$$

// $r_\iota$ is given in (34), $\alpha_\iota$ is given in (28)

Step 2: if $\Omega = \|\cdot\|_\Gamma^2$ then

$$r_* \leftarrow \begin{cases} r_{\iota_*} & \text{if } r_{\iota_*} \in [-\gamma, \gamma] \\ \text{sign}(r_{\iota_*}) \cdot \gamma & \text{otherwise} \end{cases} \quad (32)$$

else $r_* \leftarrow r_{\iota_*}$;
Return $(\iota_*, r_*)$;

| Algorithm 3 DP-RADOS |
|---|
| Input set of rados $\mathcal{S}_r \doteq \{\pi_1, \pi_2, ..., \pi_n\}$; radius $r_e > 0$, privacy budget $\varepsilon > 0$; <br> Step 1 : let $\mathcal{S}_r^{DP} \leftarrow \emptyset$; <br> Step 2 : for $j = 1, 2, ..., n$ <br>      Step 2.1 : sample $z_j$ as $z_{jk} \sim \text{Lap}(nr_e/\varepsilon), \forall k \in [d]$; <br>      Step 2.2 : $\mathcal{S}_r^{DP} \leftarrow \mathcal{S}_r^{DP} \cup \{\pi_j + z_j\}$; <br> Return $\mathcal{S}_r^{DP}$; |

Fig. 17

LEARNING WITH TRANSFORMED DATA

CROSS-REFERENCE TO RELATED APPLICATIONS

The present application claims priority from Australian Provisional Patent Application No 2014904261 filed on 24 Oct. 2014, the content of which is incorporated herein by reference. The present application also claims priority from Australian Provisional Patent Application No 2015900308 filed on 2 Feb. 2015, the content of which is incorporated herein by reference.

TECHNICAL FIELD

This disclosure relates to learning with transformed data.

BACKGROUND ART

Companies that provide services or products over the Internet often collect a wide range of data from their customers and process this data to obtain aggregated insights into their client's behaviour.

FIG. 1 illustrates a prior art corporate-centric computer network 100 with three participating customers or users 102, 104 and 106 operating three respective Internet enabled communication devices, such as smartphones, 108, 110 and 112. The users 102, 104 and 106 are registered with a social media provider 114 and interact with each other by providing indications of their preferences, posting comments or uploading and tagging photos. In essence, these activities involve storing the personal data related to the three users 102, 104 and 106 on a database 116 operated by the social media provider 114.

A server 118 is connected to the database 116 and the server 118 analyses the user data stored on database 116 to derive aggregated information. The result may then be sold to a third party, such as an advertising company 120. However, users 102, 104 and 106 are reluctant to share private or sensitive information. Therefore, it is difficult to derive aggregated insights based on private or confidential data related to the users 102, 104 and 106.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

There is provided a computer implemented method for determining multiple training samples from multiple data samples, each of the multiple data samples comprising one or more feature values and a label that classifies that data sample. The method comprises:
  determining each of the multiple training samples by
    randomly selecting a subset of the multiple data samples, and
    combining the feature values of the data samples of the subset based on the label of each of the data samples of the subset.

Since the training samples are combinations of randomly chosen data samples, the training samples can be provided to third parties without disclosing the actual training data. This is an advantage over existing methods in cases where the data is confidential and should therefore not be shared with a learner of a classifier, for example.

The method may comprise storing the multiple training samples. The method may comprise sending the multiple training samples to a computer system with or without storing them. Two combinations may have common data samples.

Randomly selecting the subset of the multiple data samples may comprise multiplying each of the multiple data samples by a random selection value that is unequal to zero to select that data sample or equal to zero to deselect that data sample.

The random selection value that is unequal to zero may be '1'.

Combining the feature values of the data samples may comprise determining a sum of the feature values of the data samples such that the feature value of a feature of the training sample is the sum of the feature values of that feature of the data samples. Determining the sum may comprise determining a weighted sum that is weighted based on the label of each of the data samples.

Determining the sum may comprise determining a weighted sum that is weighted based on the number of data samples in the subset of the multiple data samples.

As a result of the label-dependent weights, data samples that are identical but have different labels have a reduced influence on the result of the weighted sum. Therefore, the result of the sum is indicative of how relevant this feature is for the classification into the different labels.

The weighted sum may be weighted based on a random number such that randomly selecting the subset of the multiple data samples is performed simultaneously with combining the feature values.

Randomly selecting a subset of multiple data samples may comprise randomly selecting a subset of multiple data samples based on a non-uniform distribution.

It is an advantage that the non-uniform distribution of training samples over the dataset makes the reconstruction of the dataset more difficult compared to the case of a uniform distribution.

The data samples may have signed real values as features values and the label may be one of '−1' and '+1'.

Determining each of the multiple training samples may comprise determining each of the multiple training samples such that each of the multiple training samples is based on at least a predetermined number of data samples.

Randomly selecting a subset of the multiple data samples may comprise randomly selecting a subset of the multiple data samples that comprises at least a predetermined number of data samples.

A computer implemented method for determining multiple training samples comprises:
  receiving a training sample according to the above method; and
  determining for each feature value of the training sample a random value and adding the random value to that feature value to determine a modified training sample.

It is an advantage that the addition of random values has low complexity while at the same time providing additional differential privacy to the training samples. Other techniques that add noise to the data directly make the level of noise required for a significant protection layer to destroy the data to an extent that the learned classifier has low quality. In contrast, the proposed method adds noise to a training sample that already combines multiple data samples. As a result, the destructive influence of the noise on the data is less and the classification result is better given a required privacy protection.

Determining the modified training sample may be performed by a different computer system than determining the training sample.

Software that, when installed on a computer, causes the computer to perform the above method.

There is provided a computer system for determining multiple training samples from multiple data samples. The computer system comprises:
- an input port to receive the multiple data samples, each of the multiple data samples comprising one or more feature values and a label that classifies that data sample; and
- a processor to determining each of the multiple training samples by
  - randomly selecting a subset of the multiple data samples, and
  - combining the feature values of the data samples of the subset based on the label of each of the data samples of the subset.

There is provided a computer implemented method for determining a classifier coefficient associated with a feature index. The method comprises:
- receiving multiple training values associated with the feature index, each training value being based on a combination of a subset of multiple data values based on multiple data labels, each of the multiple data labels being associated with one of the multiple data values;
- determining a correlation value based on the multiple training values, such that the correlation value is indicative of a correlation between each of the multiple data values and the data label associated with that data value; and
- determining the classifier coefficient based on the correlation value.

Since the correlation value is determined on the training values and not on the data values, it is possible to train the classifier without knowing the actual data values. This is an advantage over existing boosting algorithms in cases where the data is confidential and should therefore not be shared with the learner of the classifier. Determining the classifier coefficient may comprise updating the classifier based on a preceding value of the classifier coefficient.

The method may further comprise determining for each of the multiple training values a training value weight associated with that training value, wherein determining the correlation value may be based on the training value weight associated with each of the multiple training values.

Determining the correlation value may comprise determining a sum of training values weighted by the training value weight associated with each of the multiple training values.

Determining the correlation value may comprise:
- determining a maximum training value; and
- dividing the sum by the maximum training value.

Determining the training value weight associated with each of the training values may comprise determining the training value weight associated with each of the multiple training values based on the correlation value.

Determining the training value weight may comprise updating the training value weight based on a preceding value of the training value weight.

Determining each training value weight associated with one of the multiple training values may comprise:
- determining a maximum training value; and
- determining the training value weight based on a fraction of the one of the multiple training values over the maximum training value.

The method may further comprise performing multiple repetitions of the method to determine multiple classifier coefficients, each classifier coefficient being associated with one of multiple feature indices.

A first classifier weight associated with a first feature index may be determined in a first repetition and a second classifier weight associated with a second feature index may be determined in a second repetition. The first feature index may be equal or different to the second feature index.

Determining the training value weight may comprise determining the training value weight based on a difference between a first value of a regularization function of a current repetition and a second value of the regularization function of a previous repetition.

The regularization function may depend on the multiple classifier coefficients associated with the corresponding repetition.

Determining the training value weight may comprise determining the training value weight based on an exponential function having an exponent by adding the difference to the exponent.

The regularization function may comprises one or more of:
- ridge function;
- lasso function;
- $L_\infty$-regularization; and
- SLOPE regularization.

The method may further comprise selecting the feature index based on an ordering of multiple feature indices, wherein the ordering is based on the difference.

Repeating the method may comprise repeating the method to optimise a cost function of the multiple data values.

The method may further comprise:
- receiving test values; and
- determining a classification of the test values based on the classifier coefficients.

Software that, when installed on a computer, causes the computer to perform the above method for determining a classifier coefficient associated with a feature index.

There is provided a computer system for determining a classifier weight associated with a feature index. The computer system comprises:
- an input port to receive multiple training values associated with the feature index, each training value being based on a combination of a subset of multiple data values based on multiple data labels, each of the multiple data labels being associated with one of the multiple data values; and
- a processor
  - to determine a correlation value based on the multiple training values, such that the correlation value is indicative of a correlation between each of the multiple data values and the data label associated with that data value, and
  - to determine the classifier coefficient based on the correlation value.

There is provided a computer implemented method for training a machine learning system comprising optimising a convex loss function, the convex loss function being based on training samples as determined according to the above method for determining multiple training samples from multiple data samples.

Optional features described of any aspect of method, computer readable medium or computer system, where appropriate, similarly apply to the other aspects also described here.

An example will be described with reference to

Figure 1:
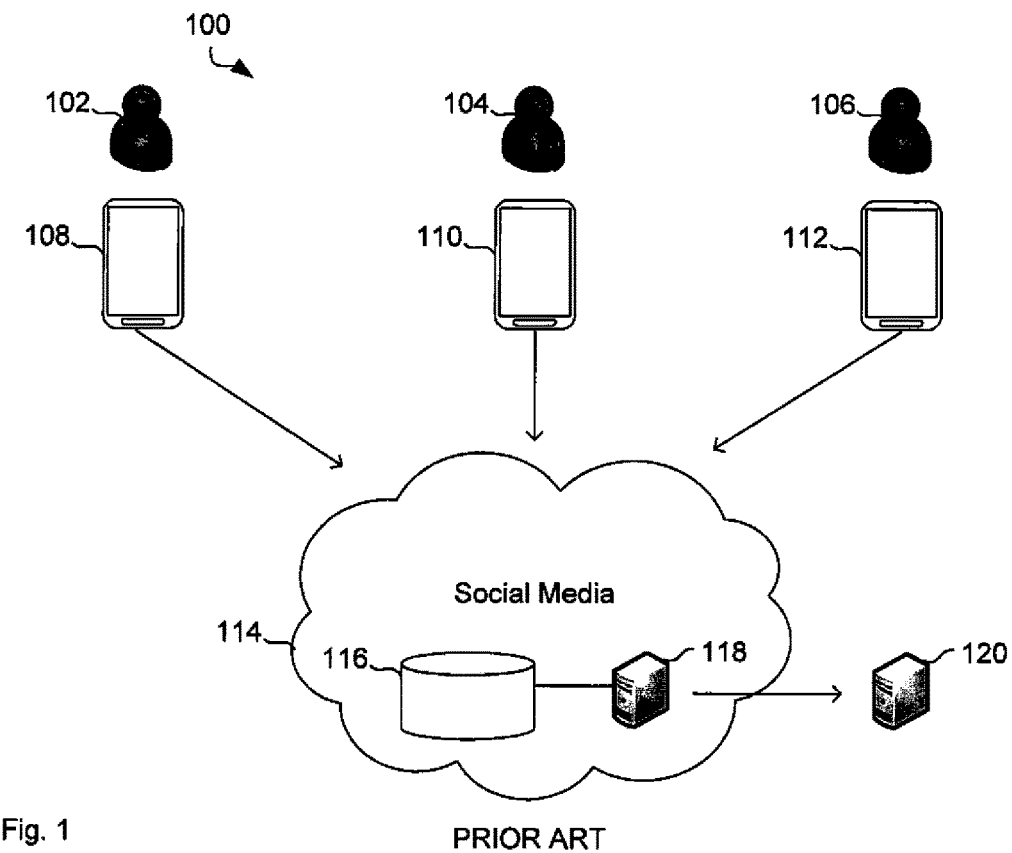
FIG. 1 illustrates a prior art corporate-centric computer network with a social media provider.
Figure 2:
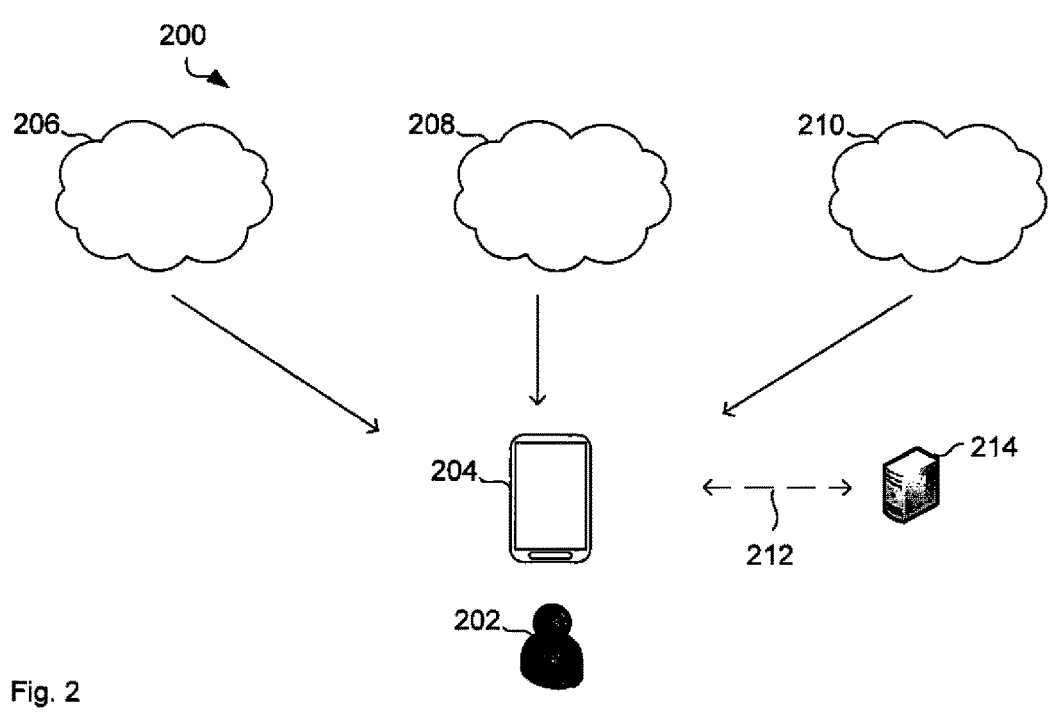

FIG. 2 illustrates a user-centric computer network with three service providers.

FIGS. 3a and 3b illustrate screenshots of a mobile app to calculate a dosage of a drug.

Figure 4:
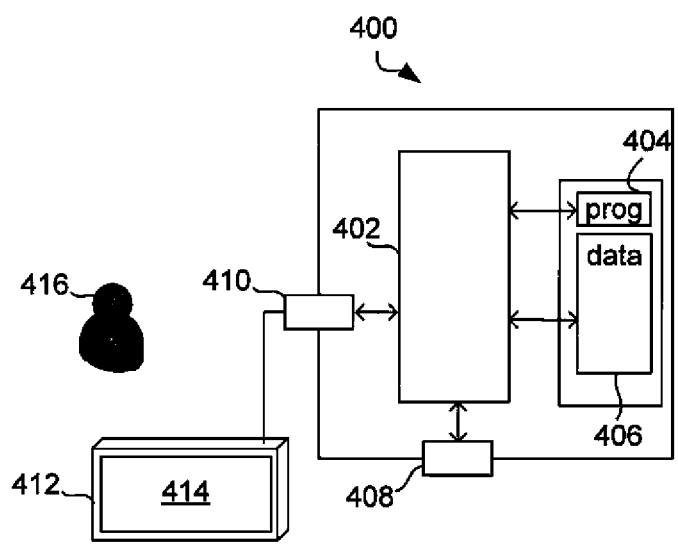

FIG. 4 illustrates a computer system for learning with transformed data.

Figure 5:
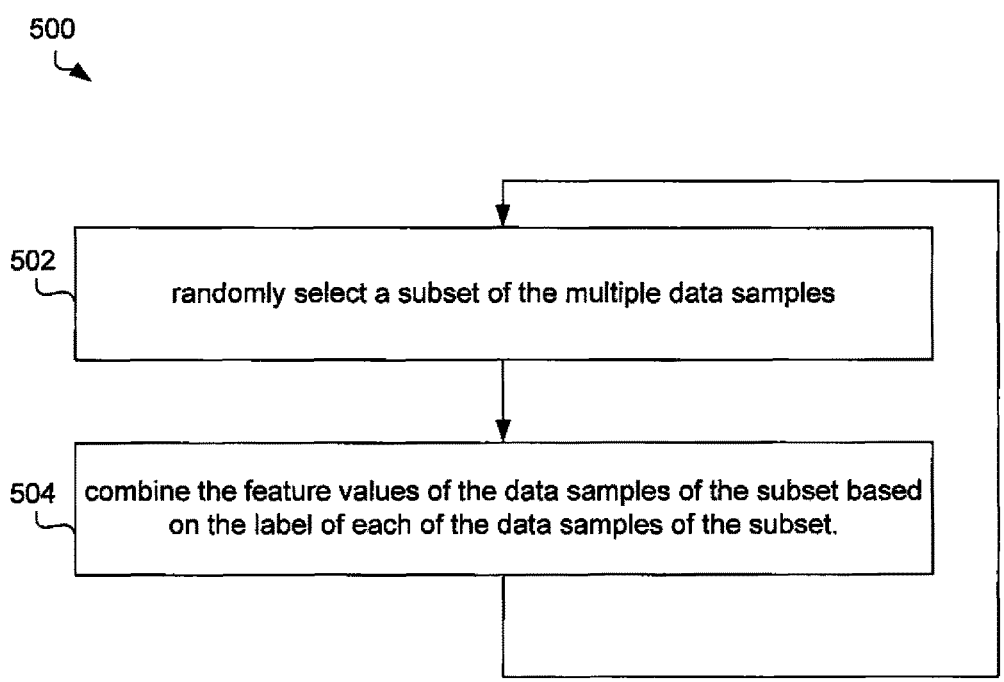

FIG. 5 illustrates a method for determining multiple training samples from multiple data samples.

Figure 6:
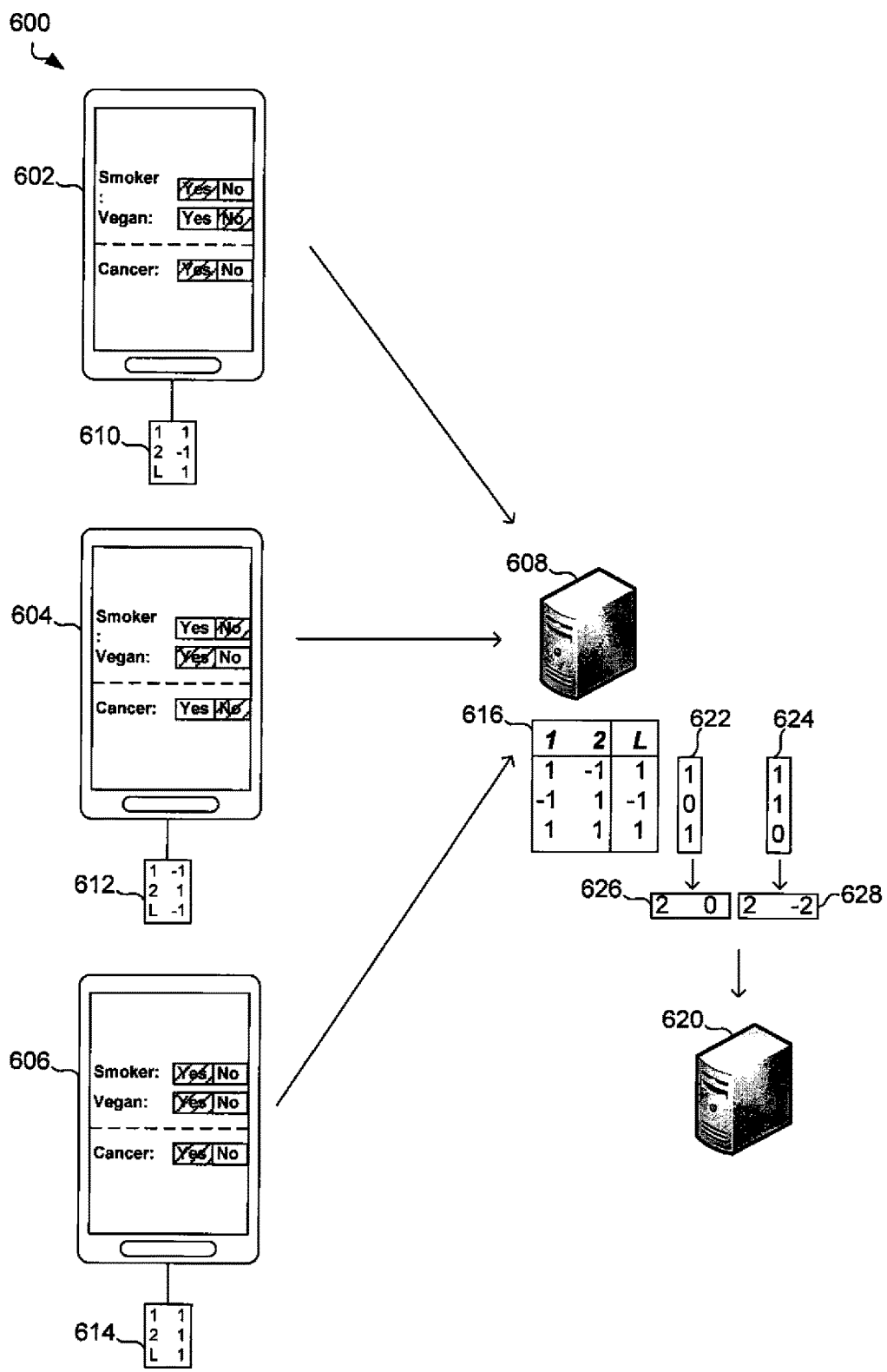

FIG. 6 illustrates a computer network for learning with transformed data.

FIG. 7 illustrates a method for determining a classifier coefficient associated with a feature index.

FIGS. 8a and 8b illustrate different repetitions of the method of FIG. 7 where a different feature index is selected in each repetition.

FIG. 9 illustrates the method of FIG. 7 in more detail.

Figure 10:
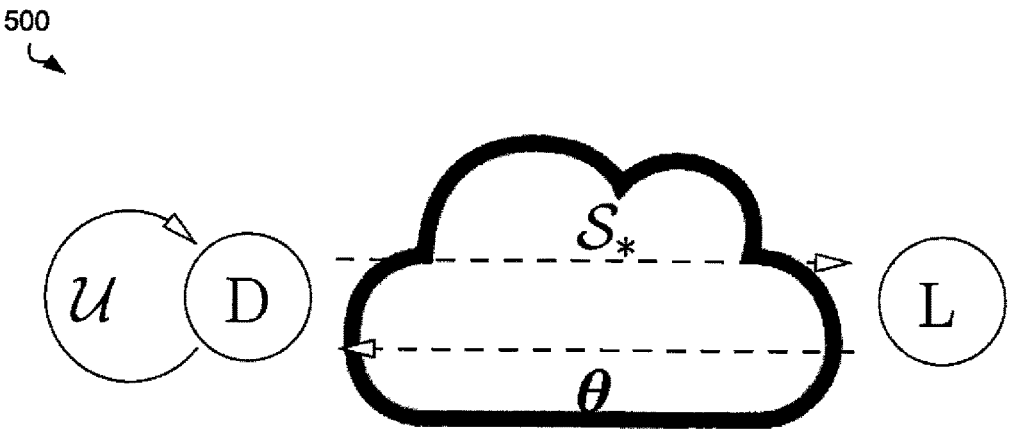
Figure 11:
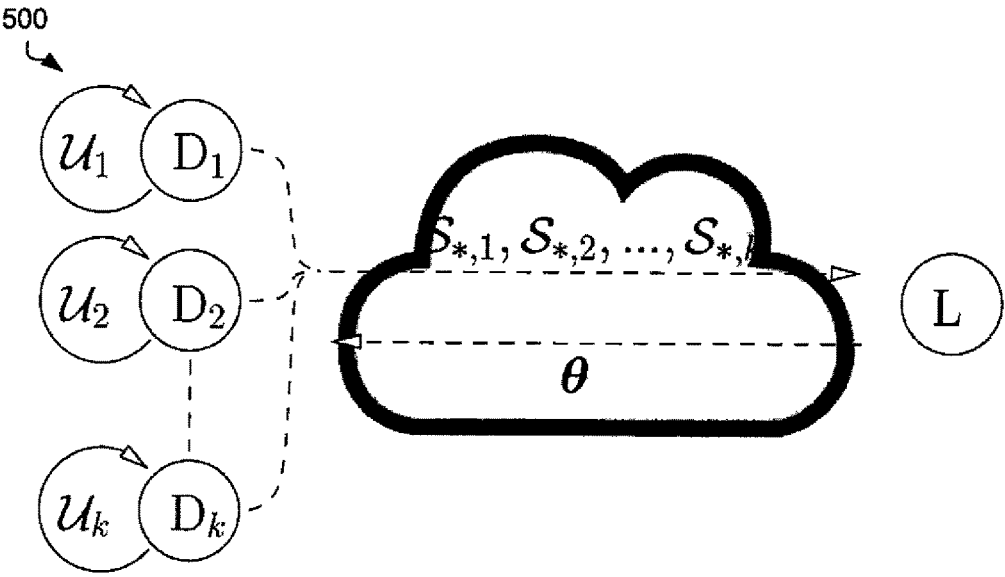
Figure 12:
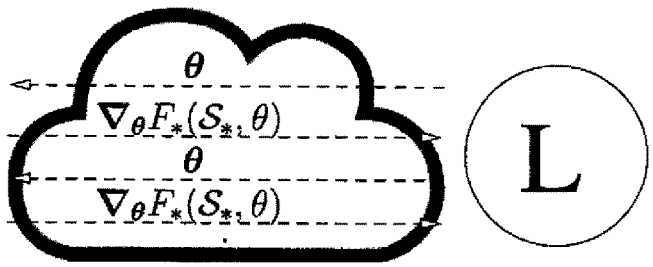

FIGS. 10, 11 and 12 illustrate example settings for learning with transformed data.

FIG. 13 illustrates an algorithm for feature-wise differential privacy compliant releasing of training samples.

FIG. 14 illustrates equivalent example rado losses.

FIG. 15 illustrates an algorithm as implemented in program code that is stored on program memory and executed by processor according to one embodiment.

FIG. 16 illustrates another embodiment of an algorithm as implemented in program code that is stored on program memory and executed by processor.

FIG. 17 illustrates an algorithm which gives a simple way to protect examples in rados.

BEST MODE FOR CARRYING OUT THE INVENTION

FIG. 2 illustrates a person-centric computer network 200 comprising user 202 operating a communication device, such as a smartphone or tablet computer, 204. User 202 receives products or services from providers 206, 208 and 210. The service providers 206, 208 and 210 collect data that is related to that user 202 and provide that data back to the user 202 to be stored on communication device 204. As a result, communication device 204 holds a rich collection of personal data related to user 202. Of course, this data may comprise data that is generated by user 202, such as by the user 202 providing preferences, taking photos, answering questions or providing comments.

User device 204 and multiple further user devices (not shown) are connected 212 to an aggregating system 214. The connection 212, that is the communication, between the user device 204 and the aggregating system 214 is such that the aggregating system 214 can determine or learn aggregated data, but the used data stored on user device 204 is not shared with aggregating system 214.

As a result, an individual 202 gathers and aggregates data from all the companies 206, 208 and 210 with whom they engage, enabling deep insights from all their engagements and consequently a much more personal understanding of individual needs, wants and behaviour.

This architecture 200 has a number of consequences. Most important, individuals now own their data. First, this means that privacy becomes a local people-centric issue and not a matter of how companies or organisations share their data. This turns the whole privacy debate on its head. Second, enormously rich data about individual behaviour becomes available at a single location. Such rich data can be aggregated by the individual as organisations themselves will not and often cannot share this deep information. Such rich data enables much deeper insights into individual behaviour and drives a new personalised analytics paradigm: "Analytics for N=1".

One important application of this technology is in management of personal health. Individuals can own their own personal health information and individuals can aggregate this information locally on their devices to provide the best possible health predictions and management solutions.

The health information may include the individual (differential) genomic sequence, the personal phenotype, information ingested during visits to the doctors or hospital, and personal (food and activity) life-style information collected from the device itself or ingested from the now popular activity measurement devices such as FuelBand.

There are three use-cases for health-related applications: A visit to the doctors and the consequent prescription of a specific drug; a medical researcher seeking to run cohort studies across a population; and an individual who wants to receive the best advice, targeted at their personal needs, sourced from the world-best medical practitioners.

FIGS. 3a and 3b illustrate two screen shots from a Warfarin dose smartphone application. FIG. 3a shows the individual's genome and phenotype information while FIG. 3b shows the results of the secure computation of Warfarin dose.

In this scenario, an individual's genome and phenotype are held securely and privately on a mobile phone. The doctor wishes to determine the appropriate dosage of Warfarin (a blood thinning agent whose optimal dosage depends on both genetic and phenotype information). A dosage is computed and returned to the doctor. While private personal data is used to compute the correct dosage, this information is kept secure by the individual and not provided to either the doctor or the drug company.

Another health related scenario is to provide a tool for cancer researchers to query individually held genomic information. Population genetics has the potential to have a major impact on understanding cancer and the development of cancer therapies—and will become increasingly important as the cost of whole genome sequencing drops to below $1,000. However, access to genomic databases has proved to be enormously difficult as different institutions have access to different data and as ethical and institutional constraints prevent this data being shared. This has become a huge impediment to cancer research.

In one scenario, all individuals own their own genetic information maintained on a personal device or on a personal cloud. Individuals then volunteer to participate with their devices while being confident that the computation is kept secure and that the data is kept private and the results anonymous.

In health-related applications, it is possible for researchers to ask questions, such as how many people have this combination of SNPs, are between these weights, have taken this medication in the past six months and exercise more than twice a week? Provided is a solution to the problem of ethics and data privacy, while simultaneously providing richer and more personal information for researchers.

Many of the privacy, security and data richness issues that abound in health are equally important in banking and personal finance applications. Decisions about spending and investment, risk and insurance, short versus long term behaviour are important both to the individual and the financial institution concerned. A solution is provided to both the data aggregation and data privacy issues while enabling rich new capabilities with analytics applied to individual customers—analytics for N=1.

In a first example individuals aggregate data and financial institutions want to better target, predict and personalise financial products and advice. In a second example businesses and even business divisions want to undertake analytics or share information across a number of different databases while making guarantees about the security and privacy of each individual database.

Individuals have access not only to their personal financial information, but also direct access to their life style, family circumstance, social behaviour, spending and investment profiles with third parties. The proposed solution allows aggregation of this personal data to create a rich source of information at a single location. Further, a financial institution can use this information to provide far more directed financial advice and personal product direction. This ensures the privacy and security of information for the individual while enabling directed individual and personalised analyses.

It is also possible to envisage a wide range of potential commercial applications, allowing individuals to monetise their data by selling deeper individual insights to third party organisations (media, marketing, sales and others).

FIG. 4 illustrates a computer system 400 for learning with transformed data. In one example, computer system 400 is used for determining multiple training samples from multiple data samples. In another example, computer system 400 is used for determining a classifier coefficient.

The computer system 400 may be a mobile phone and comprises a processor 402 connected to a program memory 404, a data memory 406, a communication port 408 and a user port 410. The program memory 404 is a non-transitory computer readable medium, such as a hard drive, a solid state disk or CD-ROM. Software, that is, an executable program stored on program memory 404 causes the processor 402 to perform the method in FIG. 5, that is, processor 402 determines each of the multiple training samples by randomly selecting a subset of the multiple data samples and combining the feature values of the selected data samples.

Since this disclosure describes multiple computer systems with similar elements to computer system 400, computer system 400 is described and illustrated only once. Where the following description states that a particular device, such as a smartphone or server performs a particular step, it is to be understood that this step is performed by processor 402 of that particular smartphone or server.

The processor 402 may store the determined training samples or classifier coefficients on data store 406, such as on RAM or a processor register. Processor 402 may also send the determined training samples or classifier coefficients via communication port 408 to another computer system, such as another mobile phone.

The processor 402 may receive data, such as data of the data samples or training samples, from data memory 406 as well as from the communications port 408 and the user port 410, which is connected to a display 412 that shows a visual representation 414 of the data set or characterisation of the data set to a user 416. In one example, the processor 402 receives the data from a storage device via communications port 408, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 402 receives and processes the data set in real time. This means that the processor 402 determines the training samples every time new data samples are received and completes this calculation before the next data update is provided.

Although communications port 408 and user port 410 are shown as distinct entities, it is to be understood that any kind of data port may be used to receive data, such as a network connection, a memory interface, a pin of the chip package of processor 402, or logical ports, such as IP sockets or parameters of functions stored on program memory 404 and executed by processor 402. These parameters may be stored on data memory 406 and may be handled by-value or by-reference, that is, as a pointer, in the source code.

The processor 402 may receive data through all these interfaces, which includes memory access of volatile memory, such as cache or RAM, or non-volatile memory, such as an optical disk drive, hard disk drive, storage server or cloud storage. The computer system 400 may further be implemented within a cloud computing environment, such as a managed group of interconnected servers hosting a dynamic number of virtual machines.

It is to be understood that any receiving step may be preceded by the processor 402 determining or computing the data that is later received. For example, the processor 402 determines the training samples or classifier coefficients and stores them in data memory 406, such as RAM or a processor register. The processor 402 then requests the data from the data memory 406, such as by providing a read signal together with a memory address. The data memory 406 provides the data as a voltage signal on a physical bit line and the processor 402 receives the training samples or classifier coefficients via a memory interface.

FIG. 5 illustrates a method 500 as performed by processor 402 for determining multiple training samples from multiple data samples. Each of the multiple data samples comprises one or more feature values and a label that classifies that data sample.

FIG. 6 illustrates a computer network 600 comprising multiple computer systems. In particular, FIG. 6 shows a first computer system 602, a second computer system 604, a third computer system 606 and a collecting server 608. Each of the three computer systems 602, 604 and 606 and the collecting server 608 comprise the elements described with reference to FIG. 4.

In one example, the aim is to learn a predictive model—such as logistic regression with a regulariser. This involves finding the parameter vector θ* that minimises the objective function $$L(\theta) = \sum_{i=1}^{N}\sum_{j=1}^{N_i}\log(1+\exp(-y_{ij}\theta^T x_{ij})) + \lambda\theta^T\theta\sum_{i=1}^{N}N_i$$

where N is the number of data providers, $N_i$ is the number of data samples, also referred to as examples, held by data provider i, $x_{ij}$ is the jth feature vector held by data provider i, $y_{ij}$ is a binary label corresponding to the feature vector $x_{ij}$, and $\lambda$ is the regularisation parameter. The aim is to find $\theta^*$, or a nearby parameter vector, while maintaining the privacy of the training examples $(x_{ij}, y_{ij})$.

One procedure for finding the optimal parameter vector involves sending the data samples to a data processing server that iteratively improving an initial guess $\theta_1$. However, sending the data samples discloses the data samples to the processing server. And therefore, procedures of this type are not privacy preserving.

In the example of FIG. 6, the collecting server 608 collects the data from the devices 602, 604 and 606. However, the collecting server 608 does not disclose the data samples but provides training samples that allow the training of a classifier to a learning server 620 without disclosing the data samples received from the devices 602, 604 and 606 to the learning server 620.

In this example, the task is to determine a logistic regression classifier based on a simple questionnaire. The questionnaire comprises three questions. Two questions are related to features while the third question is related to a label. The first question is whether a person is a smoker, while the second question is whether the person is a vegan. The third question is whether the person has cancer, that is, the label for each sample is whether the person has 'cancer'.

The task is to construct a classifier that can predict whether a person has cancer based on whether they are a smoker or a vegan. However, having cancer is information that most users would not want to share openly and therefore, it is important for the questionnaire to be successful that the privacy is preserved, which means that the information whether a particular user has cancer is not disclosed to any party or device other than trusted collecting server 608.

In this example, the three computer systems 602, 604 and 606 are smartphones and the questionnaire questions are displayed on the respective screens. Shading indicates an activated or selected user control element. A user of the first smartphone 602 has answered 'Yes' to being a smoker, 'No' to being a vegan and 'Yes' to having cancer. The answers are stored as a first data subset 610 stored on the data memory (referred to as 406 in FIG. 4) of first computer system 602. The first row relates to feature '1', which is 'smoker', the second row relates to feature '2', which is 'vegan' and the third row relates to the label 'L', which is 'cancer'. In this example, the second column stores the feature value of the respective feature where '1' represents a 'yes' answer and '−1' represents a 'no' answer.

Based on the results provided to the first smartphone 602, it appears that smoking and not being a vegan leads to having cancer. However, this conclusion is based on a single sample and is therefore statistically not significant. Incorporating more participants would make the result more significant.

In a similar way, a user of the second smartphone 604 has indicated that he is not a smoker, is not a vegan and has no cancer, which is stored as second data subset 612 on second computer system 604. A user of the third smartphone 606 has indicated that she is a smoker, a vegan and has cancer, which is stored as third data subset 614 on third computer system 606.

In other examples, the data subsets 610, 612 and 614 may store other types of data, such as face images or a genome and a particular disease. For example, the data subsets 610, 612 and 614 may include one feature for each of a large number of single-nucleotide polymorphism (SNPs), such that the subset stores a '1' if that person's DNA shows that SNP or a '−1' if it doesn't. The label may again be a specific disease, such as diabetes.

In another example, the data subsets 610, 612 and 614 comprise features related to user data, such as age, gender, address, nationality, ethnicity and so on. This user data should not be disclosed or shared with other parties.

The label may represent historical behaviour data of the respective users, such as purchased items, watched movies, read books or individual words of comments, website keywords or photographs that the users have indicated as their preference, such as by selecting a 'like' or 'love it' link.

The network 600 can then function as a recommender system where characterising the dataset means learning the relationship between the historical behaviour, preferences of the users and user data. As a result, additional items, movies, books, comments, websites photographs or the like can be recommended to the user according to the user data or preferences.

In each example, each of the data subsets 610, 612 and 614 include exactly one data sample and the devices 602,604 and 606 send their data samples to collecting server 608, which stores the data samples in a data table 616.

The data table 616 has three columns, where the first two columns hold the feature values and the third column holds the label of each data sample. Excluding the table header, the data table 616 comprises three data samples. It is noted here that method 500 in this example is performed by collecting server 608. In other examples, however, each of the smartphones 602, 604 and 606 may hold multiple data samples and may determine multiple training samples from those data samples.

In one example, collecting server 608 is operated by a collecting party that is under legal obligations to ensure privacy of the data samples 616. Learning server 620 is operated by a third party who wants to acquire dataset 616 to derive marketing related conclusions, such as the popularity of a particular product depending on the age of the customers. While the collecting party is not allowed to provide the data samples 616 to the third party, it may determine training samples that maintain the privacy of the dataset 616 and provide the training samples to the learning server 620.

The description now returns back to method 500 in FIG. 5 for determining the training samples. Processor 402 of collecting server 608 performs multiple repetitions of the method 500 to determine multiple training samples. For each training sample, processor 402 first randomly selects 502 a subset of the multiple data samples. In one example, this is achieved by multiplying each of the multiple data samples by a random selection value that is unequal to zero to select that data sample or equal to zero to deselect that data sample.

FIG. 6 shows a first vector 622 of random selection variables and a second vector 624 of random selection variables. Processor 402 generates these vectors 622 and 624 by performing a random number generation method or reading a /rand pseudo-device and uses the first vector 622 to determine a first training sample 626 and the second vector 624 to determine a second training sample 628. In the case of first vector 622 it can be seen that the first and the third entries are '1' and the second entry is '0'. As a result, the first and the third data sample are selected. In the case of the second vector 624, the first and second data samples are selected.

Processor 402 then combines the feature values of the selected data samples based on the label of each of the data samples of the subset. For example, processor 402 multiplies both feature values with the label and adds the results to determine a value for each feature. In the example of FIG. 6, the first value of the first training sample 626 is the sum of the values in the first and third rows of the first column of table 616 multiplied by '1', that is, 1+1=2. In the same manner, processor 402 determines the second feature value of the first training sample 626 and the features of the second training sample 628.

By inspection, it can be seen that the first vector 622 selects samples that represent a positive correlation between the 'smoker' feature and the 'cancer' label, represented by a positive training feature value of '2'. In contrast, the selected samples are inconclusive in relation to the 'vegan' feature, which is represented by the feature value of '0'. On the other hand, samples selected for the second training sample 628 represent a strong negative correlation between the 'vegan' feature and the 'cancer' label represented by the large negative value of '−2', which means that selected vegans have no cancer or selected non-vegans have cancer.

The above statement shows how the information of the data samples is kept while it is difficult to determine any individual contribution to the training sample without knowing the random selection vectors 622 and 624.

In one example, the training samples are referred to as rados as a short name for RADemacher OperatorS.

The following description provides an example for defining the set $\mathcal{U}$ of Rademacher operators.

We let $[n]=(1, 2, \ldots, n)$. Examples are suppose sampled i.i.d. according to an unknown but fixed distribution $\mathcal{D}$ over $\mathcal{X} \times \{-1,1\}$, where $\mathcal{X} \subseteq \mathbb{R}^d$. Let $\mathcal{S} \doteq \{(x_i, y_i), i \in [m]\}$ be a learning sample and $\Sigma_m \doteq \{-1,1\}^m$. Let y denote the $\sigma \in \Sigma_m$ such that $\sigma_i \doteq y_i$, $\forall i \in [m]$. Processor 402 determines:

Non-centered Rademacher operators $\pi_\sigma \doteq \Sigma_i \sigma_i x_i$, $\forall \sigma \in \Sigma_m$,
Centered rados (hereafter called rados)

$$\pi_\sigma^y = \pi_\sigma + \pi_y = \Sigma_i (\sigma_i + y_i) x_i, \forall \sigma \in \Sigma_m. \quad (2)$$

In all quantities, reference to learning sample $\mathcal{S}$ is implicit.

In $\pi_\sigma^y$, $\sigma$ acts like a masking variable: when $\sigma_i \neq y_i$, the contribution of example i, $y_i x_i$, is removed from the rado. to summarize, we have $$\mathcal{U} \subset \Sigma_m, \quad (3)$$

$$\mathcal{S}_* \doteq \{\pi_\sigma^y : \sigma \in \mathcal{U}\}. \quad (4)$$

Though their name suggests an i.i.d. uniform picking for the $\sigma_i$s, processor 402 can also construct more sophisticated procedures to provide a data-dependent choice. Also, the maximal cardinal of $\mathcal{U}$ is $2^m$: constructing the largest possible $\mathcal{U}$ is computationally difficult, but it is undesirable as well, since for example $|\mathcal{U}|=2^m$ would mean easy reconstruction of the $y_i \cdot x_i$s in $\mathcal{S}$. Notice that unless more knowledge is available about the data, it would be difficult to "separate" the classes from the observations though: flipping the sign of classes, Rademacher variables and observations' features does not change $\mathcal{S}_*$. Finally, $\mathcal{S}_*$ has one column less than $\mathcal{S}$, since it does not integrate separate information about classes, which can be seen in FIG. 6 by comparing the columns of training samples 626 and 628 (two columns) to the columns in data table 616 (three columns).

Equation (2) above shows mathematically how processor 402 determines each of the training samples by randomly selecting a subset of data samples and combining the data samples based on the label of each of the data samples. In particular, processor 402 calculates Equation (2) to determine a sum of the feature values of the data samples such that the feature value of a feature of the training sample is the sum of the feature values of that feature of the data samples. Further, determining the sum in Equation (2) is a weighted sum that is weighted based on the label of each of the data samples.

As can also be seen in the example of FIG. 6, the weighted sum is weighted based on a random number and randomly selecting the subset of the multiple data samples is performed simultaneously with combining the feature values, that is, both operations are performed by calculating the same equation.

In one example, the random selection is based on a non-uniform distribution. Further, in one example, the data samples have signed real values as features values and the label is '−1' or '+1'.

In another example, processor 402 divides each rado's coordinates by the number of data samples. These non-negative weights over the data samples significantly enhance the results of the learning.

As mentioned above, the collecting server 608 may send the determined training samples 626 and 628 to learning server 620. Learning server 620 has components as described with reference to FIG. 4. In particular, learning server has a program memory 404 that has stored software that causes processor 402 to perform the method of FIG. 7. Server 620 further has data memory 406 to store the training samples and the determined classifier coefficients. As described above, processor 402 of server 620 receives the training samples through communication port 408, which may be a LAN or Wi-Fi network adaptor or/and a NAS or SAN storage interface.

FIG. 7 illustrates a method 700 for determining a classifier coefficient θ associated with a feature index k. It is emphasised again that throughout this disclosure, unless noted otherwise, there is an important distinction made between 'training' samples/values and 'data' samples/values. The 'training' samples are disclosed to the learning server 620 but preserve the privacy of the 'data' samples. Nevertheless, it is possible for the learning server 620 to learn a classifier for the 'data' samples based on only the 'training' samples due to the particular construction of the 'training' samples from the 'data' samples.

Through communication port 408 processor 402 receives 702 multiple training values associated with the feature index as determined according to method 500. As described above, each training value is based on a combination of a subset of multiple data values based on multiple data labels. Each of the multiple data labels is associated with one of the multiple data values.

FIGS. 8a and 8b continue the simplified example of two training samples 626 and 628 and illustrate different repetitions of method 700 where a different feature index is selected in each repetition. Method 700 describes how processor 402 determines the classifier coefficient for one feature. Therefore, for the description of method 700 the fact that each training sample comprises multiple features is ignored for clarity. As a consequence, the samples are simple referred to values. In the example of FIG. 8a, the first feature is selected, that is, the selected feature index is t(t)=1. The training values are then the row values of the first column, that is '2' and '2'.

FIG. 9 illustrates method 700 in more detail and in the form of an Algorithm 900. Reference numerals of steps in FIG. 9 correspond to steps of method 700 in FIG. 7 where applicable.

Processor 402 determines 704 a correlation value r based on the multiple training values, such that the correlation value r is indicative of a correlation between each of the multiple data values and the data label associated with that data value. Again the correlation value r is indicative of a property of the data samples but processor 402 determines that property based on the training values and not based on the data samples.

In this example, each training value is associated with one training value weight w and the correlation value r is based on the training value weights. The weights may be initialised with the inverse of the number of training values and are determined, that is, updated in each repetition of algorithm 900 as described below.

Processor then determines 706 the classifier coefficient based on the correlation value. As can be seen in FIG. 9, processor 402 determines the correlation value by computing a sum of training values $\pi_\sigma^y$ weighted by the training value weight w associated with each of the multiple training values. Processor 402 then determines a maximum training value denoted as $\pi_{*i(t)}$ and divides the sum by the maximum training value $\pi_{*i(t)}$.

In the example of FIG. 7 considering the first feature index and assuming an initial weight of 0.5 for each training value, the result for r is '1' and consequentially, the result for the coefficient is ∞. This result is not surprising because all users who answered yes to 'smoker' also answered 'yes' to cancer and vice versa. As a result, computing the correlation value according to step 704 in algorithm 900, results in a correlation value that is indicative of a correlation between each of the multiple data values, that is answers for 'smoker', and the data label 'cancer' associated with that data value. However, that correlation is not based on the data values itself but on the training values determined by method 500.

It is noted that the weights w may be chosen as elements of a distribution, which means that the value of r is in the interval [−1,1].

Similarly, for the second feature value, processor 402 again performs method 700 and the result for r is −0.5 and −0.54 for the coefficient for the second feature. This indicates that there is a weak negative correlation between the data values for 'vegan' and the label 'cancer' associated with that data value.

Processor 402 updates the training value weight w according to an updating step 902 based on the correlation value r. Further, processor 402 may determine a maximum training value $\pi_{*i(t)}$ and determine the training value weight w based on a fraction of the one of the multiple training values $\pi_{ji(t)}$ over the maximum training value $\pi_{*i(t)}$. In other words, the fraction of the individual training value $\pi_{ji(t)}$ over the maximum training value $\pi_{*i(t)}$ is indicative to what degree the features are correlated with labels of data samples integrated into rado j. As a result of the described u dating method, training values with a weak correlation, that is $$\frac{\pi_{ji(t)}}{\pi_{*i(t)}} < r,$$

will attract an increased weight w, while training values with a strong correlation, that is $$\frac{\pi_{ji(t)}}{\pi_{*i(t)}} > r,$$

will attract a decreased weight w. This way, incorrectly classified features are prioritised.

As mentioned above, processor 402 may repeat the method to determine multiple classifier coefficients for the multiple feature indices. In each iteration, processor 402 may determine the index as a weak feature predictor index. In one example, processor 402 determines the index by the following method:

Step 1: initialise $j_{max}=-1$, $r_{max}=0$
Step 2: for j=1 to d
Step 2.1: if ((j=1) or ($|r_j|>r_{max}$)) then $j_{max} \leftarrow j$
Output: $j_{max}$ Here, $r_j$ is formula (30) below replacing (t) by j. Hence, processor 402 computes $r_t$ as in (30) for every feature, on the current set of weights. Then, processor 402 keeps the index for which the $r_t$ is the largest in absolute value stored on data store 406.

It is noted that two repetitions of the method 700 may compute the classifier coefficient and weights for different feature indices or the same feature index multiple times.

For example, if processor 402 repeats the method 700 for ten times, selects feature '1' seven times and feature '2' three times, then the sum in Equation (22) would have seven elements for feature '1' and three elements for feature '2'. For example, if feature '2' is selected in repetitions three, five and six, the sum in Equation (22) would unfold to $\theta_{10,2}=\alpha_3+\alpha_5+\alpha_7$. It is further noted that the updated weights w that were determined in the first repetition are then used in the second repetition regardless of the selection of the feature.

In this sense, processor 402 performs a modified boosting algorithm based on the training values and by repeating the method the processor 402 optimises a cost function of the multiple data values without using the actual data values but only using the training values. Once the repetitions have reached a termination criterion, such as maximum number of iterations, such as 1000, the resulting classifier coefficients can be applied to receive test values to determine a classification of the test values based on the classifier coefficients.

The following explanations provide a more detailed and mathematical description of methods 500 and 700 based on Rademacher operators (rados) as defined above.

The diptych (loss, training sample), (F(., θ), $\mathcal{S}$) may be replaced by another one, (F$_*$(., θ), $\mathcal{S}_*$)), where $\mathcal{S}_*$ is a transformation of the sample that ideally does not "reveal" $\mathcal{S}$ and F$_*$ is a concave or convex function defined on $\mathcal{S}_*$ with the primary objective that minimizing F($\mathcal{S}$, θ) is "equivalent" to optimizing F$_*$($\mathcal{S}_*$, θ). For example, the classifier realizing the optimum of the latter should be "close" to the one realizing the optimum of the former. The "new sample" $\mathcal{S}_*$, $$\mathcal{S}_* = f(\mathcal{S}, \mathcal{U}), \quad (1)$$

depends on $\mathcal{S}$ and set $\mathcal{U}$, a (possibly randomized) set of parameters used to build the new sample.

Notice that the classifier in argument of both losses may be the same, i.e. we assume no transformation of the classifier, though some may be devised to further "hide" features. Here are the main properties or assumptions we make about the setting:

θ is linear. Kernelization of the classifier may be possible, at least for some results;

the transformation $\mathcal{S} \mapsto \mathcal{S}_*$ is linear in $|\mathcal{S}|$, i.e. it can be performed in reduced time and space complexities.

Further, it can be parallelised over different processors or computers or a computing cluster to scale up computation for big datasets;

the data is communicated "one-shot", i.e. $\mathcal{S}_*$, is communicated to the learner and nothing else is communicated; hence, $\mathcal{U}$ needs not be known to optimize F. and it does not need to be communicated either.

One setting to which our task is related is presented in FIG. 10. The Database D computes $\mathcal{U}$, then $\mathcal{S}_*$ from $\mathcal{S}$, then communicates $\mathcal{S}_*$ to a Learner L. The learner learns a classifier θ over $\mathcal{S}_*$ and sends the classifier back to D.

More settings can be relevant to our task, for example when there are several databases sharing their $\mathcal{S}_*$ (and not their data), where some database may share $\mathcal{S}_*$ or data (or parameters $\mathcal{U}$), where the Learner may have subset of the data as well, etc. FIG. 11 gives another example.

This setting is related to privacy aware learning described in Duchi et al., "Privacy Aware Learning", Journal of ACM, 2014. In this case, there is repeated communication between the Database and the Learner, as shown in FIG. 12. The Learner sends parameters to the Database (here, the classifier θ), and the Database, knowing the loss function optimized by the Learner, communicates back an obfuscated gradient. This may take the form of a gradient convoluted with noise.

Defining loss $F_*$

In order not to laden notations, we shall bypass reference to $\mathcal{S}_*$, keeping only $\mathcal{S}$ and $\mathcal{U}$ in notations. The principle is the following. Given loss $F(\mathcal{S}, \theta)$, processor 402 finds function $F_*(., ., .)$ such that $$F(\mathcal{S},\theta)=g(F_*(\mathcal{S}_*,\theta))=g(F_*(\mathcal{S},\theta,\Sigma_m)), \quad (5)$$

and g is strictly monotonic. Then, processor 402 optimizes $F_*(\mathcal{S}, \theta, \mathcal{U})$ for some $\mathcal{U} \subset \Sigma_m$, with the objective that $F_*(\mathcal{S}, \theta, \mathcal{U})$ is a good approximation of $F_*(\mathcal{S}, \theta, \Sigma_m)$, at least from the standpoint of the optimal θ. One important point about the minimization of $F_*$ is that it relies only on $\mathcal{S}_*$.

So, the classifier θ is inferred without the quantitative knowledge of:

- the observations $x_i$ (i=1, 2, . . . , m),
- the classes $y_i$ (i=1, 2, . . . , m),
- the parameter set $\mathcal{U}$,
- the number of examples m.

This represents m·d+m+m·|$\mathcal{U}$|+1=(|$\mathcal{U}$|+d+1)·m+1 unknowns.

The Case of the Logistic Loss

We consider the logistic loss:

$$F_{log}(S, \theta) \doteq \frac{1}{m}\sum_i \log(1 + \exp(-y_i\theta^T x_i)). \quad (6)$$

The following Lemma shows that $F_*$ can be the exponential loss and g(z)=log(2)+(1/m)·log z. For any $\mathcal{U} \subset \Sigma_m$ with card($\mathcal{U}$)=n, let $$F_{exp}(S, \theta, \mathcal{U}) \doteq \mathbb{E}_{\sigma \sim \mathcal{U}}\left[\exp\left(-\frac{1}{2}\cdot\theta^T\pi_\sigma^y\right)\right] \doteq \frac{1}{n}\sum_{\sigma\in\mathcal{U}}\exp\left(-\frac{1}{2}\cdot\theta^T\pi_\sigma^y\right) \quad (7)$$

be the average exponential rado-loss. Then:

$$F_{log}(S, \theta) = \log(2) + \frac{1}{m}\log F_{exp}\left(S, \theta, \sum_m\right). \quad (8)$$

Minimizing the logistic loss is equivalent to minimizing the exponential rado-loss, but over the whole $\Sigma_m$. We approximate its minimization via $\mathcal{U} \subset \Sigma_m$.

The proposed algorithm is not the only procedure that can learn a model with rados. Given an expression of the rado-loss (e.g. equation (8)), any algorithm for minimising a convex function can be run for training. Consequently, a processor of a machine learning system may perform a method for training the machine learning system, the method comprising optimising a convex loss function, such as Equation (8), the convex loss function being based on training samples as determined according to method 500 in FIG. 5.

The Case of the Square Loss

We consider the square loss:

$$F_{sql}(S, \theta) \doteq \frac{1}{m}\sum_i(1 - y_i\theta^T x_i)^2. \quad (9)$$

The following Lemma shows that $F_*$ can be the mean-variance criterion and g (z)=1−(2/m)·z. We have $F_{sql}(\mathcal{S}, \theta)$=1−(2/m)·J($\mathcal{S}, \theta, \Sigma_m$), where:

$$J(S, \theta, \mathcal{U}) \doteq \mathbb{E}_{\sigma \sim \mathcal{U}}[\theta^T\pi_\sigma^y] - \frac{1}{2}\cdot\mathbb{V}_{\sigma \sim \mathcal{U}}[\theta^T\pi_\sigma^y], \quad (10)$$

for any $\mathcal{U} \subseteq \Sigma_m$, and the distribution is uniform.

Optimization through rado-based gradients

We study the communication of the gradient of the loss at hand, in a setting which can be that above. Let $\mathcal{U}_{log}$ be the discrete distribution with support $\mathcal{U}$ and such that:

$$\mathbb{P}_{\mathcal{U}_{log}}[\sigma \mid \theta] \propto \exp\left(-\frac{1}{2}\cdot\theta^T\pi_\sigma\right). \quad (24)$$

Let $\mathcal{U}_{sql}$ be the set of weights with support $\mathcal{U}$ and such that:

$$\tilde{\mathbb{P}}_{\mathcal{U}_{sql}}[\sigma \mid \theta] \doteq \frac{1 - \theta^T\pi_\sigma + \mathbb{E}_{\sigma \sim \mathcal{U}}[\theta^T\pi_\sigma]}{|\mathcal{U}|}. \quad (25)$$

The tilde notation indicates that though the sum of weights is unit, some can be negative. We extend the tilda notation to expectation, indicating reference to such a kind of weight distribution. Remark that if we ensure that $\theta^T\pi_\sigma$ belongs to [−1,1] with zero expectation over $\mathcal{U}$, then $\tilde{\mathbb{P}}\,\mathcal{U}_{sql}$ [σ|θ] is a distribution. Remark also that both distributions do not change if we replace $\pi_\sigma$ by $\pi_\sigma^y$. We have $$\nabla_\theta(\log F_{exp}(S, \theta, \mathcal{U})) = -\frac{1}{2}\cdot\mathbb{E}_{\mathcal{U}_{log}}[\pi_\sigma^y \mid \theta], \quad (26)$$

$$\nabla_\theta(-J(S, \theta, \mathcal{U})) = -\tilde{\mathbb{E}}_{\mathcal{U}_{sql}}[\pi_\sigma^y \mid \theta]. \quad (27)$$

Rado-Boosting Via the Exponential Rado-Loss

Suppose processor 402 is given a set of centered rados $\mathcal{S}_*$ as training values, whose elements $\pi_\sigma^y$ are renamed for short as:

$$\mathcal{S}_*\doteq\{\pi_j,j\in[n]\}. \quad (28)$$

coordinate n of $\pi_n$ (resp classifier $\theta_t$) is denoted $\pi_{nj}$ (resp. $\theta_{tj}$). We let $$\pi_{*n} = \max_j |\pi_{jn}| \qquad (29)$$

denote the maximum rado feature in absolute value. We let wfi denote a weak feature index oracle, that is given as input the set of centered rados and a weight vector $w_t$, which is a discrete distribution over the rados ($1^T w_t = 1$, $w_{tj} \geq 0$, $\forall j \in [n]$). wfi outputs the index of a feature whose leveraging coefficient is going to be updated.

[t] Rademacher Operator Boosting (RadoBoost)

Input set of centered rados $\mathcal{S}_*$ with card($\mathcal{S}_*$)=n, number of iterations T∈ ℕ $_*$; Step 1: let $\theta_0 \leftarrow 0$, $w_0 \uparrow (1/n)1$; //initial classifier and weights Step 2: for t=1, 2, . . . , T Step 2.1: [d] ∋ (t)←wfi($\mathcal{S}_*$, $w_t$); //get weak feature predictor index (t) Step 2.2: let $$r_t \leftarrow \frac{1}{\pi_{*(t)}} \sum_{j=1}^{n} w_{tj} \pi_{j(t)}; \qquad (30)$$

$$\alpha_t \leftarrow \frac{1}{\pi_{*(t)}} \log \frac{1+r_t}{1-r_t}; \qquad (31)$$

Step 2.3: for j=1, 2, . . . , n $$w_{(t+1)j} \leftarrow w_{tj} \cdot \left( \frac{1 - \frac{r_t \pi_{j(t)}}{\pi_{*(t)}}}{1 - r_t^2} \right); \qquad (32)$$

Return $\theta_T$ defined by:

$$\theta_{Tk} \doteq \Sigma_{t:(t)=k} \alpha_t \,\forall k \in [d]; \qquad (33)$$

Performing algorithm 900, RadoBoost processor 402 learns and stores a linear classifier from rado-set $\mathcal{S}_*$ and number of iterations T. RadoBoost 900 does not need to know the number of examples m to learn. We analyze RadoBoost in the light of the following Weak Learning Assumption, named (WLA):

the feature returned by wfi satisfies:

$$\exists > 0: |r_t| \geq \gamma, \forall t \in [T]. \qquad (34)$$

Suppose the (WLA) holds. Then after T rounds of boosting, the following upperbound holds on the exponential rado-loss of $\theta_T$:

$$F_{exp}(\mathcal{S}, \theta, \mathcal{U}) \leq \exp(-T^2/2), \qquad (35)$$

and the following upperbound holds on the $\mathcal{S}_*$-approximate logistic loss of $\theta_T$:

$$F_{log}(\mathcal{S}, \theta, \mathcal{U}) \leq \log(2) - \frac{T^2}{2m}. \qquad (36)$$

A question may be asked as to whether the weak learning assumption we make for rado-boosting, and that for boosting as it would be done on $\mathcal{S}$ are "equivalent". We now show that, essentially up to some constant, they are indeed equivalent, so rado-boosting does not artificially "stretch" the weak learning assumption.

To state our result, we need the following definition. Denote for short $\sigma_j \in \Sigma_m$, such that $\pi_j = \pi_{\sigma j}^y = \pi_{\sigma j} + \pi_y$. The average weighted label-similarity in $\mathcal{S}_*$ at with respect to weight w, ($\mathcal{S}_*|w$), is defined as:

$$[0,d] \ni (\mathcal{S}_*|w) \doteq d - \mathbb{E}_{j \sim w}[H(\sigma_j, y)], \qquad (37)$$

where H(., .) is Hamming distance. To define the weak learning assumption in the context of boosting over $\mathcal{S}$, we let $$\mu(\mathcal{S}|w;k) \doteq \frac{1}{x_{*k}} \sum_{i=1}^{m} w_i x_{ik}, \qquad (38)$$

where w denotes a weight vector over examples, $x_{*k} \doteq \max_i |x_{ik}|$, and j∈ [d] is a feature index. Eq. (38) is the one that would replace $r_t$ in (34) in the Weak Learning Assumption as carried out in boosting, hence stipulating that there exists $\gamma > 0$ such that for any weight vector w over $\mathcal{S}$, there exists a feature k such that $|\mu(\mathcal{S}|w;k)| \geq \gamma$.

Suppose (WLA) holds for feature k≐(t). Then there exists a weight vector w over $\mathcal{S}$ such that:

$$|\mu(\mathcal{S}|w;k)| \geq \gamma' \doteq 2 \cdot \frac{x_{*k}(\mathcal{S}_*|w_t)}{\pi_{*k}} \cdot \gamma. \qquad (39)$$

Features may be centered, i.e. $x \mapsto (x-\mu)/\sigma$. Domains with a real valued class to predict may be transformed into a binary classification problem by predicting whether the class is greater than the mean, i.e. after centering, processor 402 may replace the class by its sign.

Processor 402 may run the boosting algorithm 900 for a total number of T=1000 iterations with a fixed $|\mathcal{S}_*| \mapsto =$ min{1000, train size/2}, guaranteeing that the number of rados does not exceed half the size of the training set.

Differential Privacy Results

We consider datasets in which all d description variables are signed binary values ($x_{ik} \in \{-1,1\}$). We let $|\mathcal{S}| = m$ and assume without loss of generality that $$|\{i: y_i x_{ik}=1\}| \in [m-1]_*. \qquad (42)$$

Eq. (42) says equivalently that the feature is not trivial from the learning standpoint. Otherwise, any classifier of the form $\theta = \alpha x_k$ (for the k violating eq. (42)) with sign($\alpha$)=+1 iff $|\{i: y_i x_{ik} > 0\}| = m$, and sign($\alpha$)=−1 iff $|\{i: y_i x_{ik} > 0\}| = 0$ would have zero empirical risk. Algorithm DP-Feat uses notation $m_k(+) \doteq |\{i: y_i x_{ik}=1\}|$.

A key to a differential-privacy compliant release of rados seems to be the clamping of the uniform distribution of the as, that is, their uniform i.i.d. generation but on a strict subset of $\Sigma_m$. It is seems also (e.g. for boosting) that the generation of rados according to a distribution that keeps their expectation to the mean operator is important for certain positive learning results out of rados.

This motivates the following definition. Let $\tilde{\Sigma}_m$ denote a distribution with support c $\Sigma_m$. We say that $\tilde{\Sigma}_m$ is mean-operator compliant iff $1\mathbb{E}_{\sigma \sim \tilde{\Sigma}_m}[\pi_\sigma^y] = \pi_y = m \cdot \mu$.

Let $(\pi_\sigma^y)_k$ denote the $k^{th}$ coordinate of rado $\pi_\sigma^y$. We first study the feature-wise differential privacy of rados. In this setting, the user targets the differential privacy on one selected, "important" feature k∈ [d].

FIG. 13 illustrates another algorithm 1300 where Step 2 ensures that $\Sigma_{m,\beta}$ of Equation (2) is not empty, that is, algorithm 1300 is an add-on to the generation of rados according to Equation (2). Basically, $\alpha$ is divided by a constant greater than 1.

Because Step 4 uses sampling σs in $\Sigma_m$, we also let $\Sigma_{m,\beta}$ denote the uniform distribution over $\Sigma_{m,\beta}$. Step 4 can be implemented by a straightforward Rademacher i.i.d. rejection sampling of the σs in $\Sigma_m$. Let us call this scheme Rademacher rejection sampling for short.

For any δ>0, we define $$n_\delta^* \doteq \frac{\delta(1-\exp(2\beta-1))}{4\beta} \quad (>0). \tag{43}$$

We let $T_{Rrs}$ denote the total number of randomly generated σs in Rademacher rejection sampling before the set of n Rademacher operators is obtained. We want $T_{Rrs}$ to be as close as possible to the lowest possible value, n.

The following three properties hold on Algorithm DP-Feat:
1. Algorithm DP-Feat gives E-differential privacy on feature k;
2. Algorithm DP-Feat is mean-operator compliant;
3. Let δ>0. With probability≥1−δ, $T_{Rrs} \leq n \cdot t_\delta^*$ with:

$$t_\delta^* = \begin{cases} 1 & \text{if } n \leq n_\delta^* \\ \left\lceil \frac{1}{mD_{KL}(1-\beta\|1/2)} \log \frac{4\beta n}{\delta(1-\exp(2\beta-1))} \right\rceil & \text{otherwise} \end{cases} \tag{44}$$

Hence, Rademacher rejection sampling is simple and may be very efficient if ε is not too close to 0. This treats differential privacy on a per-feature basis.

Computational Complexity Results

Sparse Approximation I (SA-I)

$\mathcal{P} = \{\pi_1, \pi_2, \ldots, \pi_n\}$, a set of centered rados, integer $m \in \mathbb{N}_*$, max error $r \in \mathbb{R}_+$, max norm l, p-norm $\|.\|_p$ with $p=\infty$.

Does there exist a set of m sparse examples $\{(x_j, y_j), j \in [m]\}$ and a set of n Rademacher assignments $\sigma_1, \sigma_2, \ldots, \sigma_n \in \{-1,1\}^m$ such that:

$$\|x_j\|_p \leq l, \forall j \in [m], \text{(Sparse examples)} \tag{57}$$

$$\|\pi_i - \pi_{\sigma_i}^y\|_p \leq r, \forall i \in [n]. \text{(Rado approximation)} \tag{58}$$

SA-I is NP-Complete.

Remarks:
The hardness of SA-I does not rely on the combinatorial hardness of picking the Rademacher variables, but on fitting a set of examples whose size is bounded (number of examples and norm of the examples).

The problem remains NP-complete if there is a Feature Sign Leak, i.e. if we disclose the possible signs that may take each feature.

Privacy Leak Check I (PLC-I).

$\mathcal{S}$ a set of examples, $\mathcal{P} = \{\pi_1, \pi_2, \ldots, \pi_n\}$, a set of centered rados, integer $m \in \mathbb{N}_*$, max error $r \in \mathbb{R}_+$, p-norm $\|.\|_p$ with $p=\infty$.

Does there exist a subset of m examples of S that would approximately lead to the rados observed? More precisely, does there exist $\{(x_j, y_j), j \in [m]\} \subseteq \mathcal{S}$ and a set of n Rademacher assignments $\sigma_1, \sigma_2, \ldots, \sigma_n \in \{-1,1\}^m$ such that:

$$\|\pi_i - \pi_{\sigma_i}^y\|_p \leq r, \forall i \in [n]. \text{(Rado approximation)} \tag{59}$$

PLC-I is NP-Complete.

Remarks:
The hardness of PLC-I does not rely on the combinatorial hardness of picking the Rademacher variables, but on finding a limited subset of the dataset that could lead to the observed rados.

The problem remains NP-complete if there is a Feature Sign Leak, i.e. if we disclose the possible signs that may take each feature.

This problem is interesting in the context where an third party (agency, business), possessing all data about the domain, wants to check whether the Dataset entity can possess a part of its data.

While in the examples above the training samples are referred to as rados as a short name for RADemacher OperatorS, in other examples the term rado stands for RADemacher ObservationS. As an alternative to Equation (2) the Rademacher Observation may also be defined as $\pi_\sigma = (1/2) \cdot \Sigma_i (\sigma_i + y_i) x_i$, which may simplify the notation.

In some of the examples above, it may be assumed that the data samples are the clean original data as received from the measurement, such as DNA samples, survey answers, financial data, etc. However, in some examples, there is a privacy requirement as a result of which the clean data is not available but only data that are subject to random noise to keep the actual data private. An example of such noisy data is differential privacy (DP) compliant data.

If the random noise added to the data is symmetric, such as spherical, an average over a large number of samples will still be accurate as the random noise "cancels out".

However, the rados are generated on a subset of these noisy samples and it is possible that some of the generated rados are based on only a small number of noisy samples. The RadoBoost method explained in relation to FIGS. 7, 8a, 8b and 9 may show degraded performance if the amount of noise exceeds a certain threshold. This means that the method converges slower and therefore, more samples are needed for a similar accuracy.

In one example, processor 402 generates rados from DP-compliant examples so as to approximately keep the convergence rates achieved using clean data. More precisely, we assume that edge vectors are DP-compliant. A gold standard to protect data in the DP framework is to convolute data with noise. One popular mechanism is the Gaussian mechanism, which convolutes data with independent Gaussian random variables $\mathbb{N}(0, \zeta^2 I)$, whose standard deviation S depends on the DP requirement (ε, δ).

Strong DP regimes are difficult to handle for many efficient learning algorithms, in the sense that their good properties may quickly degrade with noise unless harsh structural assumptions hold. For example, the approximation factor ρ of the singular vectors under DP noise of the noisy power method roughly behaves as $\rho = \Omega(\zeta/\Delta)$ where $\Delta = O(d)$ is a difference between two singular values. When ζ is small, this is a very good bound. When however the DP requirement blows up, the bound is much less relevant.

The product of a label with a feature vector is referred to as an 'edge vector', that is, each rado sums a subset of edge vectors over the examples (1 edge=1 observation times a label). We consider the inequality $\mathbb{P}_\mathcal{A}[O|I] \leq \exp(\epsilon) \mathbb{P}_\mathcal{A}[O|I'] + \delta$, $\forall I \approx I'$, O. with I and I' being two sets of m vector edges differing by one edge vector, and O is a noisified set of m edge vectors generated through the Gaussian mechanism.

We now show the following non-trivial result: provided processor 402 designs another particular $\Sigma_r$, the convergence rate of RadoBoost, as measured over non-noisy rados, essentially survives noise injection in the edge vectors through the Gaussian mechanism (regardless of its amplitude), as long as m is large enough. Processor 402 picks rados summing a large number of edge vectors only (this is the design of $\Sigma_r$), so that the i.i.d. noise component gets sufficiently concentrated for the algorithm to be able to learn almost as fast as in the noise-free setting.

We emphasize the non-trivial fact that convergence rate is measured over the non-noisy rados, which of course RadoBoost does not see. The result is of independent interest in the boosting framework, since it makes use of a particular weak learner, which is called prudential, which picks features for which $|r_t|$ (19) in FIG. 9 is upperbounded. Processor 402 first renormalizes the leveraging coefficients $\alpha_t$ (eq. (20) in FIG. 9) in RadoBoost by a parameter $\kappa \geq 1$ given as input, so that we now have $\alpha_t \leftarrow (1/(\kappa\pi_{*i\ (t)}))\log((1+r_t)/(1-r_t))$ in Step 2.2. The convergence rate of now becomes, prior to applying the (WLA)

$$F^r_{log}(S, \theta_T, \mathcal{U}) \leq \log(2) - \frac{1}{2\kappa m}\sum_t r_t^2. \qquad (60)$$

We say that WFI is $\lambda_p$-prudential for $\lambda_p > 0$ iff it selects at each iteration a feature such that $|r_t| \leq \lambda_p$. Vector edges have been DP-protected by computing $y_i(x_i + x_i^r)$, with $x_i^r \sim \mathbb{N}(0, \zeta^2 I)$ (for $i \in [m]$). Let $$\Sigma_r = \Sigma_m^{m*} = \{\sigma \in \Sigma_m: m_\sigma = m_*\}, \qquad (61)$$

for some $m_* \in \mathbb{N}_*$, letting $m_\sigma = |\{i: \sigma_i = y_i\}|$ denote the support of a rado.

In these examples, the support of each rado is greater than a predetermined threshold, which means that each of the multiple training samples is based on at least a predetermined number of data samples.

This threshold may be integrated into the random selection of data samples, which means the processor 402 randomly selects a subset of the multiple data samples that comprises at least a predetermined threshold number of data samples. In one example, this threshold is half the number of data samples.

In the DP-Theorem below, the tilda in "õ(.)" hides dependencies in terms other than the eq's parameters. DP-Theorem: $\forall t > 0$, if $(\zeta \ln(1/t))/\sqrt{m_*} = \tilde{o}(1)$, then $\exists \lambda_p > 0$ s. t. using a $\lambda_p$- prudential weak learner outputs $\theta_T$ which, with probability $\geq 1 - \tau$, meets:

$$F^r_{log}(S, \theta_T, \mathcal{U}) \leq \log(2) - \frac{1}{4\kappa m}\sum_t r_t^2. \qquad (62)$$

The proof details parameters and dependencies hidden in the statement. The use of a prudential weak learner is rather intuitive in a noisy setting since $\alpha_t$ blows up when $|r_t|$ is close to 1.

The DP-Theorem essentially yields that a sufficiently large support for rados is enough to keep with high probability the convergence rate of RadoBoost within noise-free regime. Of course, the weak learner is prudential, which implies bounded $|r_t| < 1$, and furthermore the leveraging coefficients $\alpha_t$ are normalized, which implies smaller margins. Still, the DP-Theorem is a good argument to rely on rados when learning from DP-compliant edge vectors.

It is noted that supervised learning with the popular logistic loss may be equivalent to optimizing the exponential loss over sufficient statistics about the class: Rademacher observations (rados). This disclosure provides a condition on losses to be equivalent, exemplified on four rado losses.

The losses involved in the equivalences include: exponential (boosting), mean-variance (finance), Linear Hinge (on-line learning), ReLU (deep learning), and unhinged (statistics) losses.

A sufficient condition, which holds for the four rado losses, is provided under which regularizing the loss over examples is equivalent to regularizing the rados in the equivalent rado loss, that is, regularizing data with Minkowski sums to penalize the margins of classifiers. This may be applied in the context of sparsity-controlling regularization, and a formal boosting algorithm is proposed for the regularized exponential rado loss, for regularizations including the popular ridge and lasso choices. Differentially private mechanism may be applied to protect examples in rados as a form of surrogate regularization, and learning with protected rados can very significantly outperform learning with protected examples.

One example uses a two-player zero sum game representation of convex losses, that can be useful to analyse boosting algorithms with one key difference: payoffs are non linear convex, eventually non-differentiable. These also resemble the entropic dual losses with the difference that proposed methods may not enforce conjugacy over the simplex.

In an example game, the learner's adversary fits weights that bring the worst picture of the classifier it learns. The strategy of the learner is then to fit a classifier assuming this worst case distribution, which then gives rise to a loss that can be used to learn a classifier from data. The conditions of the game are slightly different for examples and rados, as the total weight must be unit for rados.

Necessary and sufficient conditions are provided for the resulting losses over examples and rados to be equivalent. Informally, equivalence happens iff the convex functions of the games satisfy a symmetry relationship and the weights satisfy a linear system of equations.

The losses involved include: exponential, logistic, square, mean-variance, ReLU, linear Hinge, and unhinged losses (and many others).

Further, there is provided a sufficient condition for the equivalence under which regularising the example loss is equivalent to regularising the rados in the rado loss, i.e. making a Minkowski sum of the rado set with a singleton whose element is proportional to the classifier. This property is independent of the regularizer. For example, ridge regression over the examples equivalently penalizes margins in the rado loss. It turns out that all four cases of equivalence meet this sufficient condition. Further, there is provided an efficient boosting algorithm, that fits a classifier from rados using the exponential regularized rado loss, using (a generalisation of) ridge and/or lasso regularization, as well as $L_\infty$-regularization. This last case of regularization is unusual, as it typically encourages the reduction of sparsity.

Our experiments show that it is indeed desirable to control the parsimony of the model and not just to increase it in the general case. From the theoretical standpoint, we show that for any of these regularizations, the algorithm is a boosting algorithm with an exponentially fast convergence of the exponential regularized rado loss under the usual weak learning assumption. Thus, no additional specific assumption is necessary for very fast convergence in the regularized framework. The theoretical analysis reveals that a key to boosting relies on modifying the weak learner compared to the unregularized learning case.

There is further provided a direct application of to E-differential privacy, where the method protects directly the examples, granting the property that all subsequent stages are differentially private as well. One mechanism to protect examples consists in adding an i.i.d. random noise vector, e.g. sampled from Laplace distribution.

We show theoretically that this protection mechanism in rados amounts to a surrogate form of regularization of the clean examples' loss, and furthermore the amount of noise to put in rados can be commensurate to the one we would pick to protect examples themselves. In other words, since rados' norm may be larger than examples' (all the more on big domains), noise may be much less damaging when learning from protected rados, and thus it may be possible to afford tiny privacy budgets (e.g. $\varepsilon < 10^{-4}$) at little cost in accuracy. Experiments display that this indeed happens.

Games and Equivalent Example/Rado Losses

We first start by defining and analysing our general two players game setting. To avoid notational load, we shall not put immediately the learning setting at play, considering for the moment that the learner fits a general vector $z \in \mathbb{R}^m$, which depends both on data (examples or rados) and classifier. Let $[m]\{1, 2, \ldots, m\}$ and $\Sigma_m\{-1,1\}^m$, for $m>0$. Let $\varphi_e: \mathbb{R} \to \mathbb{R}$ and $\varphi_r: \mathbb{R} \to \mathbb{R}$ two convex and lower-semicontinuous generators. We define functions $\mathcal{L}_e: \mathbb{R}^m \times \mathbb{R}^m \to \mathbb{R}$ and $\mathcal{L}_r: \mathbb{R}^{2^m} \times \mathbb{R}^m \to \mathbb{R}$:

$$\mathcal{L}_e(p, z) \sum_{i \in [m]} p_i z_i +_e \sum_{i \in [m]} \varphi_e(p_i), \tag{63}$$

$$\mathcal{L}_r(q, z) \sum_{I \subseteq [m]} q_I \sum_{i \in I} z_i +_r \sum_{I \subseteq [m]} \varphi_r(q_I), \tag{64}$$

where $_e, _r > 0$ do not depend on z. For the notation to be meaningful, the coordinates in q are assumed (wlog) to be in bijection with $2^{[m]}$. The dependence of both problems in their respective generators is implicit and shall be clear from context. The adversary's goal is to fit $$p^*(z) \arg\min_{p \in R^m} \mathcal{L}_e(p, z), \tag{65}$$

$$q^*(z) \arg\min_{q \in H^{2^m}} \mathcal{L}_r(q, z), \tag{66}$$

with $\mathbb{H}^{2^m 2^m} \{q \in \mathbb{R}^{2^m} : 1^T q = 1\}$, so as to attain $$\mathcal{L}_e^*(z) \mathcal{L}_e(p^*(z), z), \tag{67}$$

$$\mathcal{L}_r^*(z) \mathcal{L}_r(q^*(z), z), \tag{68}$$

and let $\partial \mathcal{L}_e^*(z)$ and $\partial \mathcal{L}_r^*(z)$ denote their subdifferentials. We view the learner's task as the problem of maximising the corresponding problems in eq. (67) (with examples) or (68) (with rados), or equivalently minimising negative the corresponding problems, which we call a loss function. The question of when these two problems are equivalent from the learner's standpoint motivates the following definition.

Definition 1: Two generators $\varphi_e, \varphi_r$ are said proportionate iff for any $m>0$, there exists $(_e, _r)$ such that $$\mathcal{L}_e^*(z) = \mathcal{L}_r^*(z) + b, \forall z \in \mathbb{R}^m, \tag{69}$$

where b does not depend on z. For any $m \in \mathbb{N}_*$, we define matrix $G_m \in \{0,1\}^{m \times 2^m}$ as:

$$G_m \begin{bmatrix} 0_{2^{m-1}}^T & 1_{2^{m-1}}^T \\ G_{m-1} & G_{m-1} \end{bmatrix} \tag{70}$$

if $m>1$, and $G_1 [0,1]$ otherwise ($z_d$ denotes a vector in $\mathbb{R}^d$). Each column of $G_m$ is the binary indicator vector for the edge vectors considered in a rado, and we assume w log these to correspond to the bijection between $2^{[m]}$ and the coordinates of $q^{(*)}(z)$.

Theorem 2: $\varphi_e, \varphi_r$ are proportionate iff the optimal solutions $p^*(z)$ and $q^*(z)$ to eqs (65) and (66) satisfy $$p^*(z) \in \partial \mathcal{L}_r^*(z), \tag{71}$$

$$G_m q^*(z) \in \partial \mathcal{L}_r^*(z) \tag{72}$$

In the case where $\varphi_e, \varphi_r$ are differentiable, they are proportionate iff $p^*(z) = G_m q^*(z)$.

Theorem 2 gives a necessary and sufficient condition for two generators to be proportionate. It does not say how to construct one from the other. We now prune the search space: if $\varphi_e$ is proportionate to some $\varphi_r$, then it has to be a "symmetrised" version of $\varphi_r$, according to the following definition.

Definition 3: Let $\varphi_r$ such that $\text{dom}(\varphi_e) \supseteq (0,1)$. We call $\varphi_{s(r)}(z) \varphi_r(z) + \varphi_r(1-z)$ the symmetrisation of $\varphi_r$.

Lemma 4: If $\varphi_e$ and $\varphi_r$ are proportionate, then $\varphi_e(z) = (,1_e) \cdot \varphi_s(r)(z) + (b1_e)$, where b appears in eq. (69).

To summarize; $\varphi_e$ and $\varphi_r$ are proportionate iff (i) they meet the structural property that $\varphi_e$ is (proportional to) the symmetrised version of $\varphi_n$, (according to Definition 2), and (ii) the optimal solutions $p^*(z)$ and $q^*(z)$ to problems (63) and (64) satisfy the conditions of Theorem 2. Depending on the direction, we have two cases to craft proportionate generators. First, if we have $\varphi_r$, then necessarily $\varphi_e \propto \varphi_{s(r)}$ so we merely have to check Theorem 2. Second, if we have $\varphi_e$, then it matches Definition 2. Alternatively, $-\varphi_e$ is permissible In this case, we have to find $\varphi_r = f + g$ where $g(z) = -g(1-z)$ and $\varphi_e(z) = f(z) + f(1-z)$.

We now come back to $\mathcal{L}_e^*(z)$, $\mathcal{L}_r^*(z)$ as defined in Definition 2, and make the connection with e xample and r ado losses. In the next definition, an e-loss $l_e(z)$ is a function defined over the coordinates of z, and a r-loss $l_r(z)$ is a function defined over the subsets of sums of coordinates. Functions can depend on other parameters as well.

Definition 5: Suppose e-loss $l_e(z)$ and r-loss $l_r(z)$ are such that there exist (i) $f_e: \mathbb{R} \to \mathcal{L}$ and $f_r(z): \mathbb{R} \to \mathcal{L}$ both strictly increasing and such that, $\forall z \in \mathbb{R}^m$, $$-\mathcal{L}_e^*(z) = f_e(l_e(z)) \tag{73}$$

$$-\mathcal{L}_r^*(z) = f_r(l_r(z)) \tag{74}$$

Then the couple $(l_e, l_r)$ is called a couple of equivalent example-rado losses.

Hereafter, we just write $\varphi_s$ instead of $\varphi_{s(r)}$.

Lemma 6: $\varphi_r(z) \doteq z \log z - z$ is proportionate to $\varphi_e \doteq \varphi_s = z \log z + (1-z) \log(1-z) - 1$, whenever $\mu_e = \mu_r$.

Corollary 7: The following example and rado losses are equivalent for any $>0$:

$$\ell_e(z,) = \sum_{i \in [m]} \log(1 + \exp(-\tfrac{1}{\cdot} z_i)), \tag{75}$$

$$\ell_r(z,) = \sum_{I \subseteq [m]} \exp\left(-\tfrac{1}{\cdot} \sum_{i \in I} z_i\right). \tag{76}$$

Lemma 8: $\varphi_r(z) \doteq (\tfrac{1}{2}) z^2$ is proportionate to $\varphi_e \doteq \varphi_s = (\tfrac{1}{2})(1-2z(1-z))$ whenever $\mu_e = \mu_r / 2^{m-1}$.

Corollary 9: The following example and rado losses are equivalent, for any $>0$:

$$\ell_e(z, \mu) = \sum_{i \in [m]} \left(1 - \frac{1}{\mu} \cdot z_i\right)^2, \tag{77}$$

$$\ell_r(z, \mu) = -\left(E_I\left[\frac{1}{\mu} \cdot \sum_{i \in I} z_i\right] - \mu \cdot V_I\left[\frac{1}{\mu} \cdot \sum_{i \in I} z_i\right]\right), \tag{78}$$

where $\mathbb{E}_I[X(I)]$ and $\mathbb{V}_I[X(I)]$ denote the expectation and variance of $X$ wrt uniform weights on $I \subseteq [m]$.

We now investigate cases of non differentiable proportionate generators, the first of which is self-proportionate ($\varphi_e = \varphi_r$). We let $\mathcal{X}_z(z)$ denote the indicator function:

$$\mathcal{X}_A(z) \doteq \begin{cases} 0 & \text{if } z \in A \\ +\infty & \text{otherwise} \end{cases}, \tag{79}$$

which is convex since $\mathcal{A} = [0, 1]$ is convex.

Lemma 10: $\varphi_r(z) \doteq \mathcal{X}_{[0,1]}(z)$ is self-proportionate, $\forall \mu_e, \mu_r$.

Corollary 11: The following example and rado losses are equivalent, for any $\mu_e, \mu_r$:

$$\ell_e(z, \mu_e) = \sum_{i \in [m]} \max\left\{0, -\frac{1}{\mu_e} \cdot z_i\right\}, \tag{80}$$

$$\ell_r(z, \mu_r) = \max\left\{0, \max_{I \subseteq [m]}\left\{-\frac{1}{\mu_r} \cdot \sum_{i \in I} z_i\right\}\right\}. \tag{81}$$

Lemma 12:

$$\varphi_r(z) \doteq \mathcal{X}_{\left[\frac{1}{2^m}, \frac{1}{2}\right]}(z)$$

is proportionate to $$\varphi_e \doteq \varphi_s = \mathcal{X}_{\{\frac{1}{2}\}}(z),$$

for any $\mu_e, \mu_r$.

Corollary 13: The following example and rado losses are equivalent, for any $\mu_e, \mu_r$:

$$l_e(z, \mu_e) = \sum_i -\frac{1}{\mu_e} \cdot z_i, \tag{82}$$

$$l_r(z, \mu_r) = _I\left[-\frac{1}{\mu_r} \cdot \sum_{i \in I} z_i\right]. \tag{83}$$

FIG. 14 shows a table 1400 with examples of equivalent rado losses. Names of the rado-losses $l_r(z, \mu_r)$ are respectively the Exponential (I), Mean-variance (II), ReLU (III) and Unhinged (IV) rado loss. We use shorthands $z_i^e \doteq -(1/\mu_e) \cdot z_i$ and $z_I^r \doteq -(1/\mu_r) \cdot \Sigma_{i \in I} z_i$. Parameter $a_e$ appears in eq. (85). Column "$\mu_e$ and $\mu_r$" gives the constraints for the equivalence to hold.

Learning with (Rado) Regularized Losses

We now refer to the learning setting. The learner is given a set of examples $S = \{(x_i, y_i), i = 1, 2, \ldots, m\}$ where $x_i \in \mathbb{R}^d$, $y_i \in \Sigma_1$ (for $i = 1, 2, \ldots, m$). It returns a classifier $h: \mathbb{R}^d \to \mathbb{R}$ from a predefined set $\mathcal{H}$. Let $z_i(h) \doteq y h(x_i)$ and define $z(h)$ as the corresponding vector in $\mathbb{R}^m$, which we plug in the losses of Table 1400 to obtain the corresponding example and rado losses. Losses simplify conveniently when $\mathcal{H}$ consists of linear classifiers, $h(x) \doteq \theta^T x$ for some $\theta \in \Theta \subseteq \mathbb{R}^d$. In this case, the example loss can be described using edge vectors $S_e \doteq \{y_i \cdot x_i, i = 1, 2, \ldots, m\}$ since $z_i = \theta^T(y_i \cdot x_i)$, and the rado loss can be described using rademacher observations [?], since $\Sigma_{i \in I} z_i = \theta^T \pi_\sigma$ for $\sigma_i = y_i$ iff $i \in I$ (and $-y_i$ otherwise) and $\pi_\sigma \doteq (1/2) \cdot \Sigma_i (\sigma_i + y_i) \cdot x_i$.

Let us define $S^*_r \doteq \{\pi_\sigma, \sigma \in \Sigma_m\}$ the set of all rademacher observations. We rewrite any couple of equivalent example and rado losses as $l_e(S_e, \theta)$ and $l_r(S^*_r, \theta)$ respectively, omitting parameters $\mu_e$ and $\mu_r$, assumed to be fixed beforehand for the equivalence to hold (see Table 1400). To prevent notational overload, we blend the notions of (pointwise) loss and (samplewise) risk, as just "losses".

Let us regularize the example loss, so that the learner's goal is to minimize $$l_e(S_e, \theta, \Omega) \doteq l_e(S_e, \theta) + \Omega(\theta), \tag{84}$$

With $\Omega: \mathbb{R}^d \to \mathbb{R}$ a regularization function which does not depend on $S_e$.

Examples include ridge ($\Omega \propto \|.\|_2^2$) and lasso ($\Omega \propto \|.\|_1$) regularizations.

The following Theorem shows that when $f_e$ in eq. (73) is linear, there is a rado-loss equivalent to this regularized example loss, for any choice of $\Omega$.

Theorem 14: Suppose $\mathcal{H}$ contains linear classifiers. Let $(l_e(S_e, \theta), l_r(S^*_r, \theta))$ be any couple of equivalent example-rado losses such that $f_e$ in eq. (73) is linear:

$$f_e(z) = a_e \cdot z + b_e, \tag{85}$$

for some $a_e > 0$, $b_e \in \mathbb{R}$. Then for any regularizer $\Omega(.)$, the regularized example loss $l_e(S_e, \theta, \Omega)$ is equivalent to rado loss $l_r(S_r^{*,\Omega,\theta}, \theta)$ computed over regularized rados:

$$S_r^{*,\Omega,\theta} \doteq S_r \oplus \{(-\tilde{\Omega}(\theta) \cdot \theta\}, \tag{86}$$

where $\oplus$ is Minkowski sum and $\tilde{\Omega}(\theta) \doteq a_e \cdot \Omega(\theta) / \|\theta\|_2^2$ if $\theta \neq 0$ (and 0 otherwise).

Theorem 14 applies to all rado losses (I-IV) in Table 1400. The effect of regularization on rados is intuitive from the margin standpoint: assume that a "good" classifier $\theta$ is one that ensures lowerbounded inner products $\theta^T z \geq \tau$ for some margin threshold $\tau$. Then any good classifier on regularized rados shall actually meet, over non regularized rados, $$\theta^T \pi_\sigma \geq \tau + a_e \cdot \Omega(\theta), \tag{87}$$

thus "beating" margin threshold $\tau$ by the regularization. One important question is the way the minimisation of the regularized rado loss impacts the minimisation of the regularized examples loss when one subsamples the rados, and learns $\theta$ from some $S_r \subseteq S^*_r$.

We provide an answer for the log-loss in row I in Table 1400, and for this objective define the $\Omega$-regularized exprado-loss computed over $S_r$, with $|S_r| = n$ and $> 0$ user-fixed:

$$l_r^{exp}(S_r, \theta, \Omega) \doteq \frac{1}{n} \cdot \sum_{j \in [n]} \exp\left(-\theta^T\left(\pi_j - \omega \cdot \frac{\Omega(\theta)}{P\theta P_2^2} \cdot \theta\right)\right), \tag{88}$$

whenever $\theta \neq 0$ (otherwise, we discard the factor depending on $\omega$ in the formula). We assume that $\Omega$ is a norm, and let $l_r^{exp}(S_r, \theta)$ denote the unregularized loss ($\omega = 0$ in eq. (88)), and we let $l_e^{log}(S_e, \theta, \Omega) \doteq (1/m) \Sigma_i \log (1 + \exp(-\theta^T(y_i \cdot x_i))) + \Omega(\theta)$ denote the $\Omega$-regularized log-loss.

Notice that we normalize losses. We define the open ball $\mathcal{B}_\Omega(0, r) \doteq \{x \in \mathbb{R}^d : \Omega(x) < r\}$ and $r_\pi^* \doteq (1/m) \cdot \max_{s_r}*\Omega^*(p_\sigma)$, where $\Omega^*$ is the dual norm of $\Omega$.

Theorem 15: Assume $\Theta \subseteq \mathcal{B}(0, r_\Theta)$, for some $r_\Theta > 0$. Let:

$$\rho(\theta) \doteq \frac{sup_{\theta' \in \Theta} \max_{\pi_\sigma \in S_r^*} \exp(-\theta'^T \pi_\sigma)}{l_r^{exp}(S_r^*, \theta)}.$$

Then if m is sufficiently large, $\forall > 0$, there is probability $\geq 1-$ over the sampling of $S_r$ that any $\theta \in \Theta$ satisfies:

$$l_e^{exp}(S_e, \theta, \Omega) \leq$$

$$\log 2 + (1/m) \cdot \log l_r^{exp}(S_r, \theta, \Omega) + O\left(\frac{\rho(\theta)}{m^\beta} \cdot \sqrt{\frac{r_\theta r_\pi^*}{n} + \frac{d}{nm} \log \frac{n}{d}}\right),$$

as long as >um for some constant u>0.

Boosting with (Rado) Regularized Losses

FIG. 15 illustrates an algorithm 1500 as implemented in program code that is stored on program memory 404 and executed by processor 402 for learning with rados regularized with penalty Si to minimise loss $l_r^{exp}(S_r, \theta, \Omega)$ in eq. (88). In its statement, is a set of parameters communicated to a weak learner, which depends on $\Omega$.

Classifier $\theta_t$ is defined as:

$$\theta_t \doteq B \sum_{t'=1}^{t} \alpha_{i(t')} \cdot 1_{i(t')}, \qquad (95)$$

where $1_k$ is the $k^{th}$ canonical basis vector. Frameboxes highlight the differences with boost [?]. The expected edge $r_t$ used to compute $\alpha_t$ in eq. (90) is based on the following basis assignation:

$$r_{i(t)} \leftarrow \frac{1}{\pi_{*_{i(t)}}} \sum_{j=1}^{n} w_{tj} \pi_{ji(t)} (\in [-1, 1]). \qquad (96)$$

FIG. 16 illustrates an algorithm 1600 as implemented in program code that is stored on program memory 404 and executed by processor 402 for tweaking the computation of $r_t$ by the weak learner. Regardless of the regularization $\Omega$ chosen among the ones allowed, the pair of algorithms 1500 and 1600 keeps the same fundamental property: under the standard weak learning assumption about how algorithm 1600 picks $\iota(t)$ in Step 2.1 of algorithm 1500, it is possible to obtain convergence bounds for the regularized exponential rado loss of algorithm 1500 that almost rival (up to a constant in the exponential) those of algorithm 900 in FIG. 9, thereby showing that algorithm 1500 is a (fast) rado-boosting algorithm for all choices of regularization.

We give no direction for Step 1 in algorithm 1600, which is consistent with the definition of a weak learner in the boosting theory: all we require from the weak learner is |r| no smaller than some weak learning threshold>0.

However, we provide an optional step for the weak learner, also stated in a weak form, which provides a simple test to prefer one feature against another one, if e.g. the weak learner has to choose its feature in a set of features with the same r≥, then this order may help to resolve the indeterminacy.

Definition 16: Fix any constant $\gamma_{WL} \in (0,1)$. Algorithm 1600 is said to be a $\gamma_{WL}$-Weak Learner iff the feature $\iota(t)$ it picks at iteration t satisfies $|r_{\iota(t)}| \geq \gamma_{WL}$, for any t=1, 2, . . . , T.

This weak learning definition is essentially equivalent to the one carried out in the boosting framework.

We now provide the convergence proof of algorithm 1500 for all instantiations of $\Omega$ in Algorithm 1600, starting with $\Omega(\theta) = \|\theta\|_\Gamma^2 \doteq \theta^T \Gamma \theta$ for some fixed symmetric matrix $\Gamma > 0$. Take $\Omega(.) = \|.\|_\Gamma^2$. Fix any $0 < a < \frac{1}{5}$, and suppose that $\Gamma$ and the number of iterations T of are chosen so that $$\omega < \frac{2a \min_k \max_j \pi_{jk}^2}{T\lambda_T}, \qquad (97)$$

where $\lambda_\Gamma > 0$ is the largest eigenvalue of $\Gamma$.

Then there exists some $\gamma > 0$ (depending on a, and given to algorithm 1600) such that for any fixed $0 < \gamma_{WL} < \gamma$, if algorithm 1600 is a $\gamma_{WL}$-Weak Learner, then returns at the end of the T boosting iterations a classifier $\theta_T$ which meets:

$$l_r^{exp}(S_r, \theta_T, \|\cdot\|_\Gamma^2) \leq \exp\left(-\frac{T a \gamma_{WL}^2}{2}\right) \qquad (98)$$

Furthermore, if we fix $a = \frac{1}{7}$, then we can fix $\gamma = 0.98$, and if we consider $a = \frac{1}{10}$, then we can fix $\gamma = 0.999$.

Two remarks are in order. First, the cases of $a = \frac{1}{7}, \frac{1}{10}$ show that algorithm 1600 can still obtain large edges in eq. (96), so even a "strong" weak learner might fit in for algorithm 1600, without clamping its edges.

Second, the right-hand side of ineq. (97) may be very large if we consider that $\min_k \max_j \pi_{jk}^2$ may be proportional to $m^2$. So the constraint on $\omega$ is in fact very loose, and $\omega$ may easily meet the constraint of Theorem 15.

We now provide the convergence proof of algorithm 1500 for $\Omega(.) \in \{\|.\|_1, \|.\|_\infty\}$.

Theorem 18: Take $\Omega(.) \in \{\|.\|_1, \|.\|_\infty\}$. Consider any $\gamma_{WL} > 0$ and assume that algorithm 1600 is a $\gamma_{WL}$-Weak Learner. Fix any $a < \frac{3}{11}$ and suppose that $\omega$ is chosen so that $$\omega = a\gamma_{WL} \min_k \max_j |\pi_{jk}|. \qquad (99)$$

Then algorithm 1500 returns at the end of the T boosting iterations a classifier $\theta_T$ which meets:

$$l_r^{exp}(S_r, \theta_T, \Omega) \leq \exp\left(-\frac{\tilde{T}\gamma_{WL}^2}{2}\right), \qquad (100)$$

where $$\tilde{T} \doteq \begin{cases} a\gamma_{WL} T & \text{if } \Omega = \|\cdot\|_1 \\ (T - T_*) + a\gamma_{WL} \cdot T_* & \text{if } \Omega = \|\cdot\|_\infty \end{cases}, \qquad (101)$$

and $T_*$ is the number of iterations where the feature computing the $L_\infty$ norm was updated. If several features match this criterion, the smallest of the corresponding $T_*$ is chosen.

We can now have a look at the regularized log-loss of $\theta_T$ over examples, as depicted in Theorem 15, and show that it is guaranteed a monotonic decrease with T, with high probability, for any applicable choice of regularisation, since we get indeed that the regularized log-loss of $\theta_T$ output by, computed on examples, satisfies with high probability $l_e^{log}(S_e, \theta, \Omega) \leq \log 2 - \kappa \cdot T + \tau(m)$, with $\tau(m) \to 0$ when $m \to \infty$, and $\kappa$ does not depend on T.

Regularized Losses and Differential Privacy

The description above investigates the differentially private (DP) protection of a single sensitive feature in an example. We now investigate the complete protection of an example. We let $Lap(z|b) \doteq (\frac{1}{2}b)\exp(-|z|/b)$ denote the pdf of the Laplace distribution.

FIG. 17 illustrates algorithm 1700, which gives a simple way to protect examples in rados, by adding to each rado a fixed vector z whose coordinates follow $Lap(z|.)$. Let us define two training samples $S_e$ and $S'_e$ as being neighbours, noted $S_e \approx S'_e$, iff they differ from one example. We show how the Laplace mechanism of algorithm 1700 can give ε-differential privacy (Rados of $S_r$ are sampled uniformly at random) at low noise, and furthermore the minimisation of a rado-loss over protected rados resembles the minimisation of an optimistic bound on a regularization of the equivalent example loss over clean examples.

We make the assumption that any two edge vectors e, e' satisfy $\|e - e'\|_1 \leq r_e$, which is ensured e.g. if all examples belong to a $L_1$-ball of diameter $r_e$.

Theorem 19: Algorithm 1700 delivers ε-differential privacy. Furthermore, pick $(\Omega, \Omega^*)$ any couple of dual norms and assume $S_r = S^*_r$ ($|S_r| = 2^m$). Then $\forall \theta$, $$l_r^{exp}(S_r^{*,dp}, \theta) \leq \exp\left\{m \cdot l_e^{log}\left(S_e, \theta, (1/m) \cdot \max_\sigma \Omega * (z_\sigma) \cdot \Omega\right)\right\},$$

and $z_\sigma$ is sampled in Step 2.2 of for rado $\pi_\sigma$.

In one example, algorithm 1600 uses the order suggested to retrieve the topmost feature in the order. Hence, the weak learner returns the feature maximising $|r_t| - \delta_t$.

We may not clamp the weak learner for $\Omega(.) = \|.\|_\Gamma^2$.

The proposed algorithms may be run for a total of T=1000 iterations, and at the end of the iterations, the classifier in the sequence that minimizes the empirical loss is kept. Notice therefore that rado-based classifiers are evaluated on the training set which computes the rados (equivalently, the learner send the sequence of classifiers to the data handler, which then selects the best according to its training sample).

In one example, the number of rados is fixed to n=100. Processor 402 may sample at random out of the full training fold a subset of n=100 examples, of which is trained. To make sure that this does not impair the algorithm just because the sample is too small, processor 402 computes the test error for very large values of E (thus, there is almost no noise) as a baseline.

There is provided a boosting algorithm to minimise the exponential regularized rado loss, and regularisation is useful to improve further the results via a tighter control of the sparsity of the models built. There is also provided a mechanism for the differentially private protection of examples in rados with connection with regularising the equivalent example loss over clean examples. This protection in rados allows to pick small privacy budgets that do not endanger accuracy on large domains, which happens not to be the case when learning over protected examples.

In one example, the regulariser function above is based on a SLOPE regularization. SLOPE stands for "Sorted L-One Penalized Estimation" as in Bogdan, M, van den Berg, E., Sabath, C., Su, W., and Cand'es, E.-J. SLOPE—adaptive variable selection via convex optimization. Annals of Applied Statistics, 2015, which is included herein by reference. Processor 402 calculates the SLOPE norm of $\theta$, $\|\theta\|_\Phi$, as follows:

first, order $\theta$'s coordinates in such a way that $|\theta_1| \geq |\theta_2| \geq |\theta_3| \geq \ldots \geq |\theta_d|$.

then compute:

$$\|\theta\|_\Phi \doteq \sum_{k=1}^d |\theta_k| \xi_k, \tag{102}$$

Where $\xi_k \doteq \Phi^{-1}(1 - kq/(2d))$.

Here, $\Phi^{-1}$ is the inverse cumulative distribution function, also known as the quantile, of the standard normal distribution, that is, $\Phi^{-1}(\alpha) = z \Leftrightarrow \Pr_{X \sim N_{(0,1)}}[X \leq z] = \alpha$. q is a standard q-value in inferential statistics.

Hence, the largest coordinates of $\theta$ are more penalized than the smallest ones. SLOPE regularisation may help to control the false discovery rate, that is, the proportion of irrelevant variables that are included in the model (out of all irrelevant variables).

We now provide the convergence proof of algorithm 1500 for $\Omega = \|.\|_\Phi$.

Theorem 20: (boosting with SLOPE). Take $\Omega(.) = \|.\|_\Phi$. Suppose $w \log |\theta_{Tk}| \geq |\theta_{T(k+1)}|$, $\forall k$, and fix $\omega = 1$. Let $$a \doteq \min\left\{\frac{3\gamma_{WL}}{11}, \frac{\Phi^{-1}(1 - q/(2d))}{\min_k \max_j |\pi_{jk}|}\right\}. \tag{103}$$

Suppose (i) is a −Weak Learner for some >0, and (ii) the q-value is chosen to meet:

$$q \geq 2 \cdot \max_k\left(1 - \Phi\left(\frac{3}{11} \cdot \max_j |j_k|\right)\right) / \left(\frac{k}{d}\right).$$

Then classifier $\theta_T$ returned by at the end of the T boosting iterations satisfies:

$$l_r^{exp}(S_r, \theta_T, \|\cdot\|_\Phi) \leq \exp\left(-\frac{a^2 T}{2}\right). \tag{104}$$

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A computer implemented method for training a classifier that corresponds to confidential data, the method comprising collecting the confidential data as multiple data samples on a user device by way of a user interface, each of the multiple data samples comprising one or more feature values in a vector $x_i$, where i is an index of the data sample, and a label $y_i$ that classifies that data sample i;

creating non-confidential training data by determining a training sample as a vector of feature values $\pi$ from the multiple data samples, the training sample $\pi$ preserving the privacy of the confidential data by:

randomly selecting a subset of the multiple data samples by defining a masking variable $\sigma_i$ for each data sample i, the subset comprising more than one data sample, and combining the feature values of the data samples of the subset based on the label of each of the data samples of the subset, by determining a weighted sum of the feature values of the data samples of the subset wherein the feature value of a feature of the training sample is the weighted sum of the feature values of that feature of the data samples of the subset, wherein the weighted sum comprises a sum of feature values of that feature multiplied by the respective labels of each of the data samples of the subset by calculating $\pi=\Sigma_i (\sigma_i+y_i)x_i$, wherein feature j of the training sample is a weighted sum of values of feature j of the data samples:

repeating the step of determining the training sample to determine multiple training samples;

sending the non-confidential training data including the multiple training samples including the combined feature values to a computer system for determining the classifier weight while maintaining privacy of the confidential data by preventing access to the confidential data from the computer system;

training, by the computer system, a classifier that corresponds to the confidential data, without access to the confidential data and with access to the non-confidential training data by calculating, by the computer system, a classifier weight associated with a feature index from the multiple training samples; and classifying, by the computer system using the trained classifier, a test value by determining, by the computer system, a classification of the test values based on the classifier weight.

2. The method of claim 1, wherein randomly selecting the subset of the multiple data samples comprises multiplying each of the multiple data samples by a random selection value that is unequal to zero to select that data sample or equal to zero to deselect that data sample.

3. The method of claim 1, wherein determining the sum comprises determining a weighted sum that is weighted based on the number of data samples in the subset of the multiple data samples.

4. The method of claim 1, wherein the weighted sum is weighted based on a random number such that randomly selecting the subset of the multiple data samples is performed simultaneously with combining the feature values.

5. The method of claim 1, wherein randomly selecting a subset of multiple data samples comprises randomly selecting a subset of multiple data samples based on a non-uniform distribution.

6. The method of claim 1, wherein
the data samples have signed real values as features values, and
the label is one of '−1' and '+1'.

7. The method of claim 1, wherein determining each of the multiple training samples comprises determining each of the multiple training samples such that each of the multiple training samples is based on at least a predetermined number of data samples.

8. The method of claim 7, wherein randomly selecting a subset of the multiple data samples comprises randomly selecting a subset of the multiple data samples that comprises at least a predetermined number of data samples.

9. The method of claim 1, wherein determining multiple training samples further comprises:
determining for each feature value of the training sample a random value and adding the random value to that feature value to determine a modified training sample.

10. A non-transitory computer readable medium comprising computer-executable instructions stored thereon, that when executed by a processor, causes the processor to perform the method of claim 1.

11. A system for training a classifier that corresponds to confidential data, the system comprising a data collection device for determining multiple training samples from multiple data samples, and a computer system for receiving and processing the training samples, the data collection device comprising:
an input port to receive the multiple data samples; and
a processor configured to
collect the confidential data as the multiple data samples by way of a user interface, each of the multiple data samples comprising one or more feature values in a vector $x_i$, where i is an index of the data sample, and a label $y_i$ that classifies that data sample i;
create non-confidential training data by determining a training sample $\pi$ from the multiple data samples, the training sample $\pi$ preserving the privacy of the confidential data by
randomly selecting a subset of the multiple data samples by defining a masking variable $\sigma_i$ for each data sample i, the subset comprising more than one data sample, and
combining the feature values of the data samples of the subset based on the label of each of the data samples of the subset by determining a weighted sum of the feature values of the data samples of the subset wherein the feature value of a feature of the training sample is the weighted sum of the feature values of that feature of the data samples of the subset, wherein the weighted sum comprises a sum of feature values of that feature multiplied by the respective labels of each of the data samples of the subset by calculating $\pi=\Sigma_i (\sigma_i+y_i)x_i$, wherein feature j of the training sample is a weighted sum of values of feature j of the data samples;

repeating the step of determining the training sample to determine multiple training samples; and
to send the non-confidential training data including the multiple training samples including the combined feature values to the computer system for determining the classifier weight while maintaining privacy of the confidential data by preventing access to the confidential data from the computer system;
the computer system comprising a processor configured to:
train, by the computer system, a classifier that corresponds to the confidential data without access to the confidential data and with access to the non-confidential training data by calculating a classifier weight associated with a feature index from the multiple training samples, and
classify, by the computer system using the trained classifier, a test value by determining a classification of the test values based on the classifier weight.

12. The computer implemented method of claim 1 comprising:
receiving, by the computer system, multiple training values associated with a feature index, each training value being based on a combination of a subset of multiple data values that are kept securely on a data collection device by preventing access to the multiple data samples from the computer system, based on multiple data labels, each of the multiple data labels being associated with one of the multiple data values;
determining, by the computer system, a correlation value based on the multiple training values, such that the correlation value is indicative of a correlation between each of the multiple data values and the data label associated with that data value; and
determining, by the computer system, the classifier coefficient based on the correlation value, wherein the feature value of a feature of the training sample is a combination of the feature values of that feature of the data samples.

13. The method of claim 12, further comprising determining for each of the multiple training values a training value weight associated with that training value, wherein determining the correlation value is based on the training value weight associated with each of the multiple training values.

14. The method of claim 13, wherein determining the correlation value comprises determining a sum of training values weighted by the training value weight associated with each of the multiple training values.

15. The method of claim 14, wherein determining the correlation value comprises:
determining a maximum training value; and
dividing the sum by the maximum training value.

16. The method of claim 13, wherein determining the training value weight associated with each of the training values comprises determining the training value weight associated with each of the multiple training values based on the correlation value.

17. The method of claim 16, wherein determining each training value weight associated with one of the multiple training values comprises:
determining a maximum training value; and
determining the training value weight based on a fraction of the one of the multiple training values over the maximum training value.

18. The method of claim 12, further comprising performing multiple repetitions of the method to determine multiple classifier coefficients, each classifier coefficient being associated with one of multiple feature indices.

19. The method of claim 18, wherein determining the training value weight comprises determining the training value weight based on a difference between a first value of a regularization function of a current repetition and a second value of the regularization function of a previous repetition.

20. The method of claim 19, wherein the regularization function depends on the multiple classifier coefficients associated with the corresponding repetition.

21. The method of claim 19, wherein determining the training value weight comprises determining the training value weight based on an exponential function having an exponent by adding the difference to the exponent.

22. The method of claim 19, wherein the regularization function comprises one or more of:
ridge function;
lasso function;
–regularization; and
SLOPE regularisation.

23. The method of claim 19, further comprising selecting the feature index based on an ordering of multiple feature indices, wherein the ordering is based on the difference.

24. The method of claim 18, wherein repeating the method comprises repeating the method to optimise a cost function of the multiple data values.

25. The method of claim 12, further comprising:
receiving test values; and
determining a classification of the test values based on the classifier coefficients.

* * * * *